US008718571B2

(12) United States Patent
Tomita

(10) Patent No.: US 8,718,571 B2
(45) Date of Patent: May 6, 2014

(54) OUTPUT CIRCUIT OF HIGH-FREQUENCY TRANSMITTER

(75) Inventor: Kazuhiro Tomita, Kasugai (JP)

(73) Assignee: Spansion LLC, Sunnyvale, CA (US)

( * ) Notice: Subject to any disclaimer, the term of this patent is extended or adjusted under 35 U.S.C. 154(b) by 158 days.

(21) Appl. No.: 12/822,651

(22) Filed: Jun. 24, 2010

(65) Prior Publication Data

US 2010/0330933 A1 Dec. 30, 2010

(30) Foreign Application Priority Data

Jun. 29, 2009 (JP) ................................ 2009-153538

(51) Int. Cl.
*H04B 1/40* (2006.01)

(52) U.S. Cl.
USPC ............................................ 455/77; 455/270

(58) Field of Classification Search
USPC ............. 455/39, 41.1, 270, 42; 340/310.01-5
See application file for complete search history.

(56) References Cited

U.S. PATENT DOCUMENTS

| | | | | |
|---|---|---|---|---|
| 6,389,110 | B1 * | 5/2002 | Fischer et al. | 379/1.04 |
| 6,629,032 | B2 * | 9/2003 | Akiyama | 701/48 |
| 6,756,777 | B2 * | 6/2004 | Prazeres da Costa et al. | 324/762.02 |
| 7,706,494 | B2 * | 4/2010 | Iida | 375/367 |
| 2006/0244499 | A1 * | 11/2006 | Miyata et al. | 327/156 |
| 2009/0174476 | A1 * | 7/2009 | Komatsu et al. | 330/149 |
| 2010/0057970 | A1 * | 3/2010 | Kashi et al. | 710/305 |

FOREIGN PATENT DOCUMENTS

| | | | |
|---|---|---|---|
| JP | 02-243094 | A | 9/1990 |
| JP | 05-110475 | A | 4/1993 |
| JP | 2004-120740 | A | 4/2004 |
| JP | 2004-264067 | A | 9/2004 |
| JP | 2006-108933 | A | 4/2006 |

OTHER PUBLICATIONS

English language Abstract of Japanese Publication No. 02-243094, published Sep. 27, 1990.

English language Abstract of Japanese Publication No. 05-110475, published Apr. 30, 1993.

English language Abstract of Japanese Publication No. 2004-120740, published Apr. 15, 2004.

* cited by examiner

*Primary Examiner* — David Bilodeau
(74) *Attorney, Agent, or Firm* — Sterne, Kessler, Goldstein & Fox P.L.L.C.

(57) ABSTRACT

A transmitting and receiving device includes: a transmission circuit that transmits a signal by FM-modulating a carrier wave of the signal; an FM demodulation circuit that generates a demodulation signal by FM-demodulating the received signal; and a first filter circuit that changes a pass-band for letting the received signal pass through according to the demodulation signal, wherein the transmitting and receiving device perform a power supply line communication through the power supply line in which a signal is transmitted and received among a plurality of the transmitting and receiving devices.

7 Claims, 15 Drawing Sheets

OUTPUT CIRCUIT OF HIGH-FREQUENCY TRANSMITTER

CROSS-REFERENCE TO RELATED APPLICATIONS

This application is based upon and claims the benefit of priority of the prior Japanese Patent Application No. 2009-153538, filed on Jun. 29, 2009, the entire contents of which are incorporated herein by reference.

FIELD

The present disclosure relates to a transmitting and receiving device and a method for a power supply line communication.

BACKGROUND

Recently, with advances in multi-functionalization of electronic appliances and automobiles, functional blocks with multiple functions have been provided. The functional blocks operate in association with each other and transmit and receive signals among functional blocks through signal lines. Therefore, the number of signal lines in an electronic appliance or an automobile has increased. For example, an automobile includes an electronic control unit (ECU) for controlling an engine, a transmission, a power window, a lamp, and a door mirror. Accordingly, the number of signal lines provided in an automobile for transmitting and receiving signals between each of the ECUs has been increased.

At times a functional block supplies power to another functional block through a power supply line among the above described functional blocks. Hence, conventionally, the number of signal lines is reduced by performing power supply communication in which signals that are transmitted and received among the functional blocks are superimposed onto a power supply and transmitted. In a functional block that performs power supply communication, the power supply line is branched into a route for supplying a power and a route to a transmitting and receiving circuit. An inductance element is inserted into the route for supplying a power so that a power supply, to which signals transmitted and received among each of functional blocks are superimposed, is not supplied to functional blocks as power. On the other hand, no inductance element is inserted in the route to the transmitting and receiving circuit so that a power supply, onto which signals transmitted and received among each of functional blocks are superimposed, is transmitted to and received by the transmitting and receiving circuit (for example, refer to Japanese Laid-open Patent Publication Nos. 2004-264067, and 2006-108933).

However, as described above, when an inductance element is inserted into the route for supplying a power, if a current that is supplied from one functional block to another functional block through a power supply line increases, an inductance element with larger allowable current needs to be inserted. Such an inductance element is large in size and expensive.

When a small and inexpensive inductance element with smaller inductance is inserted into a route for supplying power, the carrier frequency needs to be higher so as to attenuate a signal superimposed onto the power supply by increasing the impedance. Thus, noise radiation becomes large due to a signal superimposed onto the power supply, and thereby the receiving sensitivity of, for example, a radio transceiver or a 1-Seg receiver is degraded.

SUMMARY

According to an aspects include a transmitting and receiving device including: a transmission circuit that transmits a signal by FM-modulating a carrier wave of the signal; an FM demodulation circuit that generates a demodulation signal by FM-demodulating the received signal; and a first filter circuit that changes a pass-band for letting the received signal pass through according to the demodulation signal, wherein the transmitting and receiving device perform a power supply line communication through the power supply line in which a signal is transmitted and received among a plurality of the transmitting and receiving devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DETAILED DESCRIPTION

First Exemplary Implementation

Hereunder, a first implementation in accordance with aspects of the present invention will be described by referring to FIGS. 1 to 12.

Figure 1:
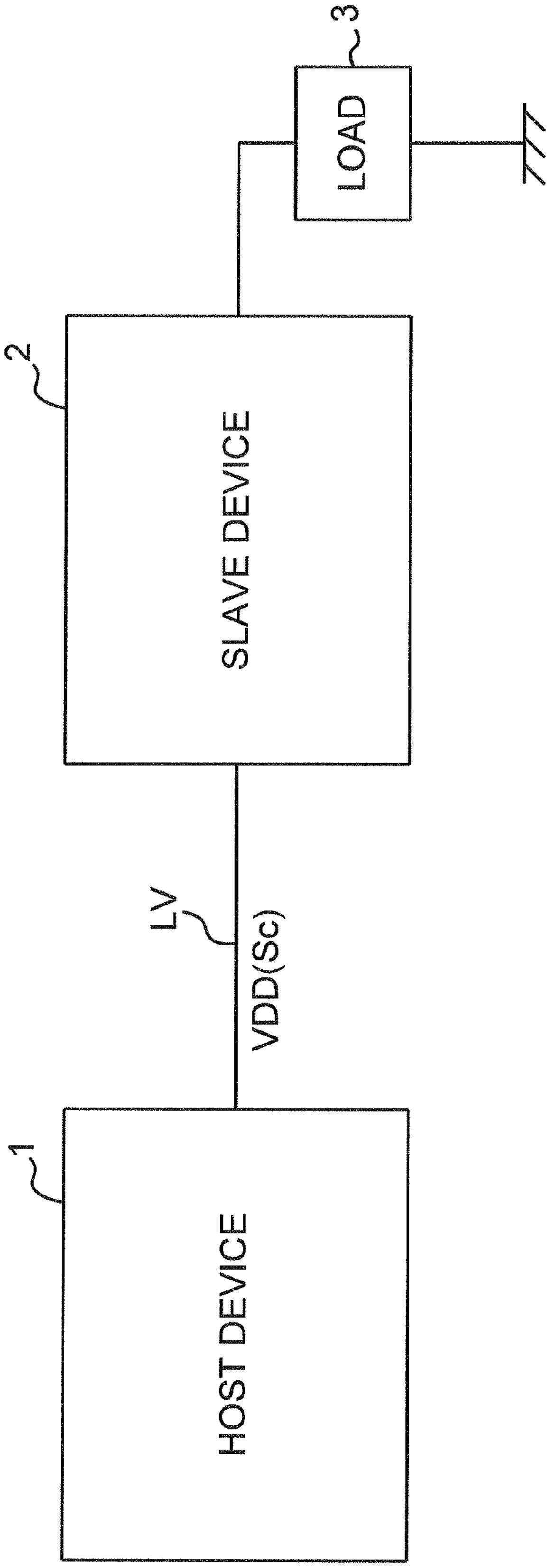
FIG. 1 is a schematic view of a network system according to a first illustration in accordance with aspects of the present invention.

FIG. 1 is a block diagram that schematically illustrates a system a network system that transfers data by a power supply line communication, the network system having configuration of a host device 1 and a slave device 2. In the network system, the host device 1 and the slave device 2 are coupled through a power supply line LV and a power supply VDD is supplied from the host device 1 to the slave device 2 through the power supply line LV.

The host device 1 transmits a communication signal Sc to the slave device 2 that is obtained by modulating a carrier wave based on data for making the slave device 2 drive and control a load 3 by superimposing the communication signal Sc onto the power supply VDD.

The slave device 2 receives the communication signal Sc from the host device 1 and demodulates the signal Sc into data for driving and controlling the load 3. The slave device 2 drives the load 3 based on the data for driving and controlling the load 3 that is obtained by demodulating the communication signal Sc transmitted from the host device. Furthermore, in response to a request from the host device 1, the slave device 2 transmits a control signal Sc to the host device 1 that is obtained by modulating a carrier wave based on data requested by the host device 1 by superimposing the control signal Sc onto the power supply VDD.

Figure 2:
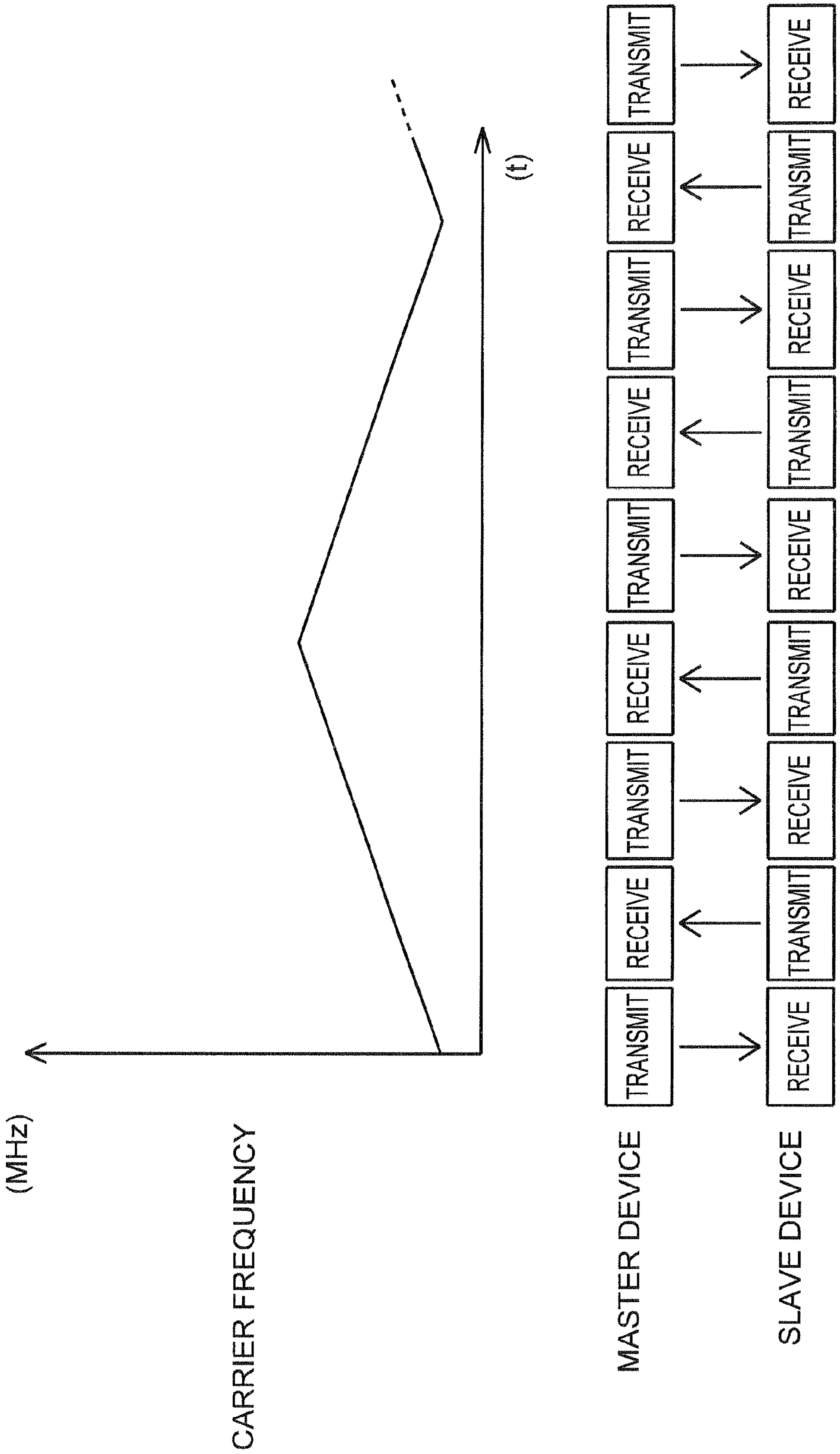
FIG. 2 is an explanatory diagram of a host device and a slave device according to the first illustration in accordance with aspects of the present invention.

In accordance with the implementation, as illustrated in FIG. 2, transmission and reception of the communication signal Sc between the host device 1 and the slave device 2 alternately repeats transmission of a communication signal Sc from the host device 1 to the slave device 2 and transmission of the communication signal Sc from the slave device 2 to the host device 1.

At this time, the host device 1 and the slave device 2 transmit the communication signal Sc by increasing and decreasing a carrier frequency of a communication signal Sc within a given frequency range. For example, the host device 1 and the slave device 2 transmit the communication signal Sc by gradually increasing the carrier frequency. The host device 1 and the slave device 2 gradually decrease the carrier frequency of the communication signal Sc when the given frequency is reached. Moreover, the host device 1 and the slave device 2 gradually increase the carrier frequency of the communication signal Sc when the given frequency is reached. As described above, the host device 1 and the slave device 2 transmit the communication signal Sc by increasing and decreasing the carrier frequency as in a triangular wave.

For example, when a network system with the above described host device 1 and the slave device 2 are provided in an automobile, the load 3 may be a driving motor of, such as a power window, a door mirror, or a lamp.

The host device 1 is provided with a switch that a user moves, for example, to operate a power window, a door mirror, or a lamp. The host device 1 outputs data to the slave device 2 for driving the motor of the power window, the door mirror, or the lamp depending on how the user operates the switch.

The slave device 2 is provided with a driving motor for the power window, the door mirror, the lamp, etc. The slave device 2 drives the driving motor for the power window, the door mirror, or the lamp according to data for driving the power window, the door mirror, or the lamp (host device 1).

Figure 3:
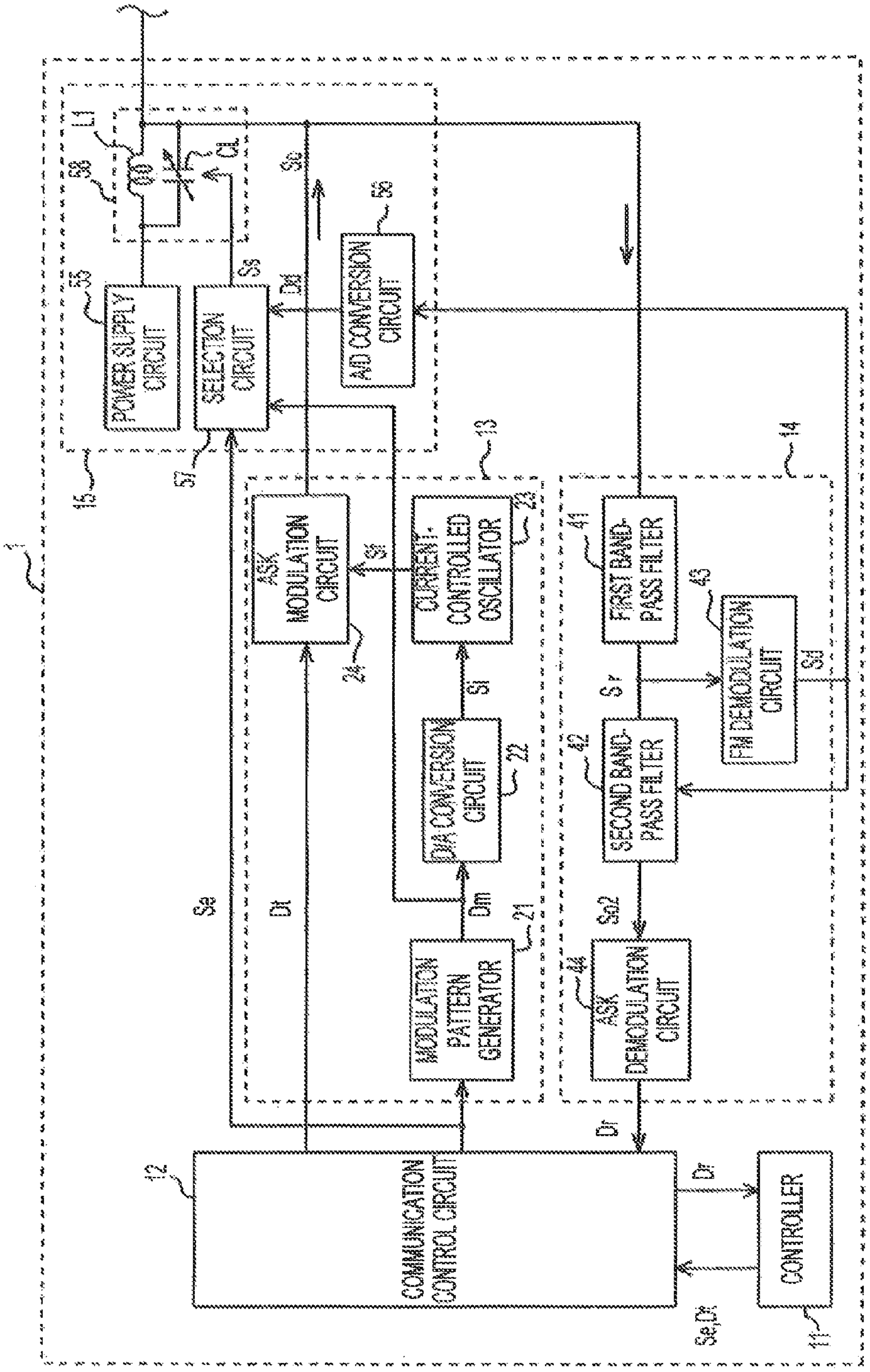
FIG. 3 is a block circuit diagram of the host device according to the first illustration in accordance with aspects of the present invention.

As illustrated in FIG. 3, in order to transfer the above described data, the host device 1 includes a controller 11, a communication control circuit 12, a transmission circuit 13, a reception circuit 14, and a power supply circuit unit 15.

The controller 11 outputs an H level communication control signal Se for making the slave device 2 transmit a communication signal Sc, and a transmission data Dt to be transmitted to the slave device 2 to the communication control circuit 12. When the host device 1 transmits the communication signal Sc to the slave device 2, the controller 11 outputs the transmission data Dt for requesting data to the slave device 2 to the communication control circuit 12. The controller 11 outputs an L level communication control signal Se for making the host device 1 receive the communication signal Sc from the slave device 2 to the communication control circuit 12. The controller 11 inputs a reception data Dr that is received from the slave device 2 to the communication control circuit 12.

The controller 11 inputs the H level communication control signal Se for making the slave device 2 transmit the communication signal Sc, and the transmission data Dt to be transmitted to the slave device 2 to the communication control circuit 12. The communication control circuit 12 outputs the H level communication control signal Se for making the slave device 2 transmit the communication signal Sc to the transmission circuit 13 and the power supply circuit 15. Moreover, the communication control circuit 12 outputs the transmission data Dt to be transmitted to the slave device 2 to the transmission circuit 13.

Furthermore, when the host device 1 transmits the communication signal Sc to the slave device 2, the controller 11 outputs the transmission data Dt for requesting data to the slave device 2 to the communication control circuit 12. The communication control circuit 12 outputs the transmission data Dt for requesting data to the slave device 2 to the transmission circuit 13. The controller 11 inputs an L level communication control signal Se for making the host device 1 receive a communication signal Sc from the slave device 2 to the communication control circuit 12. Reception data Dr that is received from the slave device 2 is input to the communication control circuit 12 from the reception circuit 14.

The transmission circuit 13 includes a modulation pattern generator 21, a digital-to-analogue (D/A) conversion circuit (D/A converter) 22, a current-controlled oscillator (ICO) 23, and an amplitude shift keying (ASK) modulation circuit 24.

The communication control circuit 12 inputs a communication control signal Se to the modulation pattern generator 21. As illustrated in FIG. 2, the modulation pattern generator 21 stores a modulation pattern for transmitting the communication signal Sc by increasing and decreasing a carrier frequency of the communication signal Sc as in a triangular wave onto a built-in memory (ROM). The modulation pattern generator 21 outputs the stored modulation patterns sequentially as a modulation pattern data Dm to the D/A conversion circuit 22 whenever an H level communication control signal Se is input, in other words, whenever the host device 1 transmits a communication signal Sc to the slave device 2.

The modulation pattern generator 21 inputs the modulation pattern data Dm to the D/A conversion circuit 22. The D/A conversion circuit 22 outputs the input modulation pattern data Dm that is a digital value by converting into a current value that is an analog value as a current control signal Si to the current-controlled oscillator 23.

Figure 4:
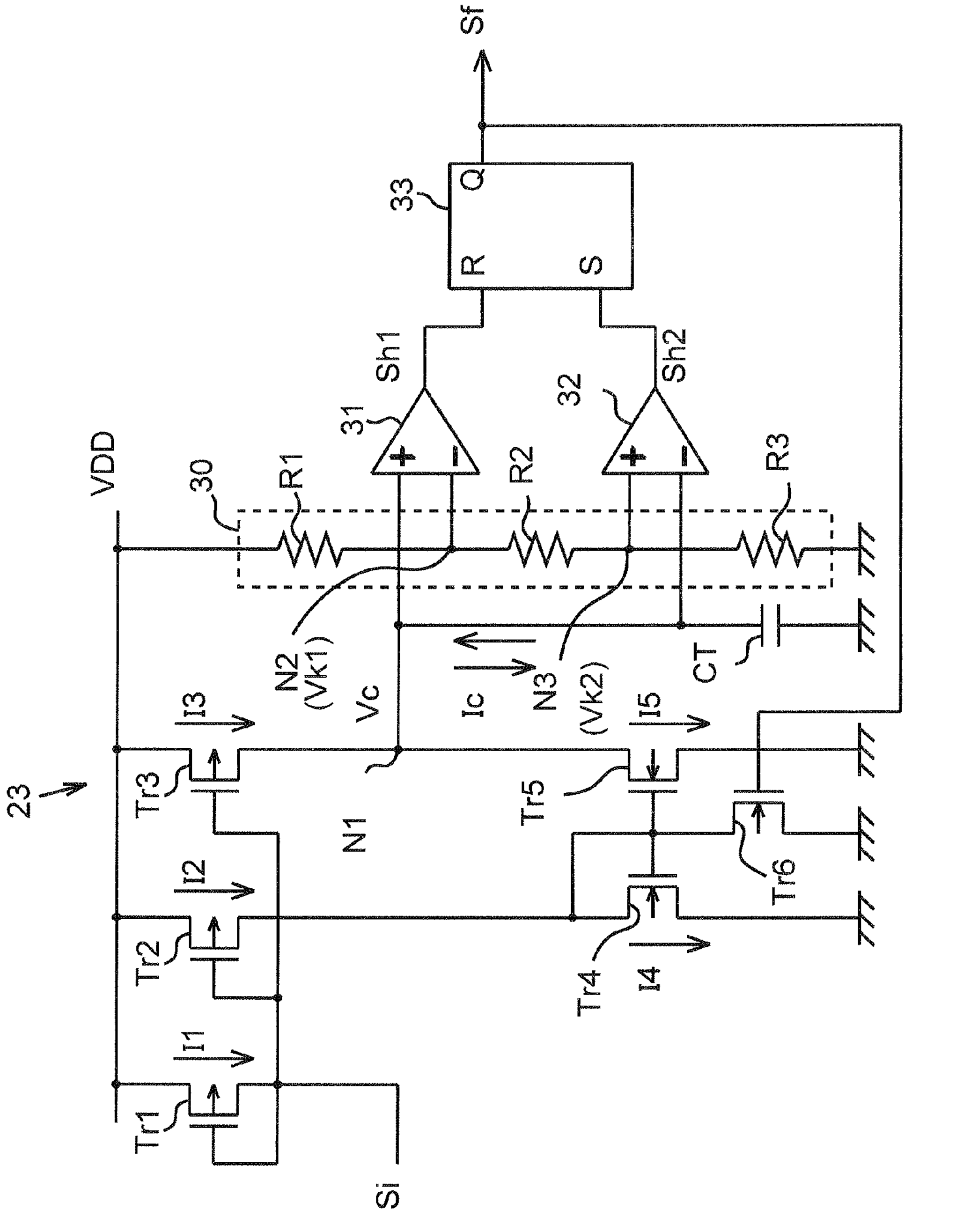
FIG. 4 is a circuit diagram of a current-controlled oscillator according to the first illustration in accordance with aspects of the present invention.

As illustrated in FIG. 4, the current-controlled oscillator 23 includes first to third transistors Tr1 to Tr3 that are made up of P-channel MOS transistors, and fourth to sixth transistors Tr4 to Tr6 that are made up of N-channel MOS transistors, a timing capacitor CT, a reference voltage generation circuit 30, a first comparator circuit 31, a second comparator circuit 32, and an RS flip-flop (RS-FF) circuit 33.

The D/A conversion circuit 22 inputs current control signals Si to a drain and a gate of the first transistor Tr1, and a power supply VDD is input to a source of the first transistor Tr1.

A drain of the second transistor Tr2 is coupled to a drain and a gate of the fourth transistor Tr4 and a source of the second transistor Tr2 is supplied with the power supply VDD. The D/A conversion circuit 22 inputs a current control signal Si to a gate of the second transistor Tr2.

A drain of the third transistor Tr3 is coupled to a drain of the fifth transistor Tr5, and a source of the third transistor Tr3 is supplied with the power source VDD. The D/A conversion circuit 22 inputs a current control signals Si to a gate of the third transistor Tr3.

The above described configuration provides a current mirror configuration that is made up of the first to the third transistors Tr1 to Tr3. For example, when sizes of the first to the third transistors Tr1 to Tr3 are substantially the same, drain currents I1 to I3 of the first to the third transistors Tr1 to Tr3 are substantially the same current values.

In other words, the drain currents I1 to I3 of the first to the third transistors Tr1 to Tr3 increase or decrease according to a current value of the current control signal Si from the D/A conversion circuit 22. In other words, when the current value of the current control signal Si is larger, the drain currents I1 to I3 of the first to the third transistors Tr1 to Tr3 become larger. Conversely, when the current value of the current control signal Si is smaller, the drain currents I1 to I3 of the first to the third transistors Tr1 to Tr3 become smaller.

A drain and a gate of the transistor Tr4 is coupled to a gate of the fifth transistor Tr5, and a source of the transistor Tr4 is coupled to a ground. A source of the fifth transistor Tr5 is coupled to a ground.

The above described configuration provides a current mirror configuration that is made up of the fourth to the fifth transistors Tr4 to Tr5. According to aspects of the implementation, a size ratio of the fourth transistor Tr4 to the fifth transistor Tr5 is 1:2. Thus, a drain current I4 of the fourth transistor Tr4 is substantially the same as the drain currents I1 to I3 of the first to the third transistors Tr1 to Tr3, and the current value is a half of a drain current I5 of the fifth transistor Tr5.

In other words, drain currents I4 and I5 of the fourth and fifth transistors Tr4 and Tr5 increase and decrease according to a current value of the current control signal Si from the D/A conversion circuit 22 as in the drain currents I1 to I3 of the first to the third transistors Tr1 to Tr3. In other words, when the current value of the current control signal Si is larger, the drain currents I4 and I5 of the fourth and fifth transistors, Tr4 and Tr5 become larger. Conversely, when the current value of the current control signal Si is smaller, the drain currents I4 and I5 of the fourth and fifth transistors, Tr4 and Tr5 become smaller.

A drain of the sixth transistor Tr6 is coupled to gates of the fourth and fifth transistors Tr4 and Tr5, and a source of the sixth transistor Tr6 is coupled to a ground. The RS-FF circuit 33 inputs a frequency modulation signal Sf to a gate of the sixth transistor Tr6. The sixth transistor Tr6 turns on and off according to the frequency modulation signal Sf.

The sixth transistor Tr6 is turned on when an H level frequency modulation signal Sf is input, and gates of the fourth and fifth transistors Tr4 and Tr5 are coupled to grounds. Accordingly, the fourth and fifth transistors Tr4 and Tr5 are turned off and the drain currents I4 and I5 do not flow. Conversely, the sixth transistor Tr6 is turned off when an L level frequency modulation signal Sf is input, and the gates of the fourth and fifth transistors Tr4 and Tr5 are not coupled to grounds. Consequently, the fourth and fifth transistors Tr4 and Tr5 are turned on and the drain currents I4 and I5 flow through.

One end of the timing capacitor CT is coupled to a coupling point of the third transistor Tr3 and the fifth transistor Tr5 (a first node N1) and the other end of the timing capacitor CT is coupled to a ground. In other words, by turning on and off the sixth transistor Tr6, a charging and discharging current Ic that is a difference between the drain current I3 of the third transistor Tr3 and the drain current I5 of the fifth transistor Try is charged to and discharged from the timing capacitor CT. For example, when the sixth transistor Tr6 is turned off, the charging and discharging current Ic is discharged from the timing capacitor CT. Conversely, when the sixth transistor Tr6 is turned on, the charging and discharging current Ic is charged to the timing capacitor CT.

In other words, the charging and discharging current Ic that is charged to or discharged from the timing capacitor CT decreases or increases according to a current value of the current control signal Si from the D/A conversion circuit 22. This means that when the current value of the current control signal Si is larger, the charging and discharging current Ic that is charged to or discharged from the timing capacitor CT becomes larger, and a speed of raising and lowering a charging voltage Vc of the timing capacitor CT of the first node N1 side becomes faster. Conversely, when the current value of the current control signal Si is smaller, the charging voltage Vc that is charged to and discharged from the timing capacitor CT becomes smaller, and a speed of raising and lowering a charging voltage Vc of the timing capacitor CT of the first node N1 side becomes slower.

The reference voltage generation circuit 30 is made up of a serial circuit of first to third resistors R1 to R3 and the serial circuit is coupled between the power supply VDD and a ground. A coupling point of the first and the second resistors R1 and R2 (a second node N2) is coupled to an inverting input terminal of the first comparator circuit 31, and a divided voltage of the second node N2 is output to the inverting input terminal as a first reference voltage Vk1. A coupling point of the second and the third resistors R2 and R3 (a third node N3) is coupled to a non-inverting input terminal of the second comparator circuit 32, and a divided voltage of the third node N3 is output to the non-inverting input terminal as a second reference voltage Vk2.

A non-inverting input terminal of the first comparator circuit 31 is coupled to the first node N1. The first comparator circuit 31 compares a charging voltage Vc of the timing capacitor CT with a first reference voltage Vk1 of the reference voltage generation circuit 30 and outputs a first comparison signal Sh1 according to the comparison result to a reset input terminal R of the RS-FF circuit 33. In other words, the first comparator circuit 31 outputs an L level first comparison signal Sh1 to the RS-FF circuit 33 when the charging voltage Vc is smaller than the first reference voltage Vk1. Conversely, the first comparator circuit 31 outputs an H level first comparison signal Sh1 to the RS-FF circuit 33 when the charging voltage Vc is the first reference voltage Vk1 or more.

An inverting input terminal of the second comparator circuit 32 is coupled to the first node N1. The second comparator circuit 32 compares a charging voltage Vc of the timing capacitor CT with a second reference voltage Vk2 of the reference voltage generation circuit 30 and outputs a second comparison signal Sh2 according to the comparison result to a set input terminal S of the RS-FF circuit 33. The second comparator circuit 32 outputs an H level second comparison signal Sh2 when the second reference voltage Vk2 is smaller than the charging voltage Vc. Conversely, the second comparator circuit 32 outputs an L level second comparison signal Sh2 when the second reference voltage Vk2 is a charging voltage Vc or more.

The first comparator circuit 31 inputs a first comparison signal Sh1 to the reset input terminal R of the RS-FF circuit 33. The second comparator circuit 32 inputs a second comparison signal Sh2 to the set input terminal S of the RS-FF circuit 33. The RS-FF circuit 33 outputs a frequency modulation signal Sf from the output terminal Q to the gate of the sixth transistor Tr6 and an ASK modulation circuit 24.

The RS-FF circuit 33 is set and outputs an H level frequency modulation signal Sf when the second comparison signal Sh2 input to the set input terminal S rises from an L level to an H level. Under the state, the RS-FF circuit 33 is reset and outputs an L level frequency modulation signal Sf when the first comparison signal Sh1 input to the reset input terminal R rises from an L level to an H level. Furthermore, from the above-described state, the RS-FF circuit 33 is set and outputs an H level frequency modulation signal Sf when the second comparison signal Sh2 rises from an L level to an H level.

According to the above described configuration, for example, the RS-FF circuit 33 is set and outputs an H level frequency modulation signal Sf, the sixth transistor Tr6 is turned on and a charging and discharging current Ic charges the timing capacitor CT. When a charging voltage Vc of the timing capacitor CT at the first node N1 side rises and becomes substantially equal to the first reference voltage Vk1, the first comparator circuit 31 outputs an H level first comparison signal Sh1 to the RS-FF circuit 33. When an H level first comparison signal Sh1 is input, the RS-FF circuit 33 resets and transitions the frequency modulation signal Sf from an H level to an L level.

The sixth transistor Tr6 is turned off and the timing capacitor CT discharges a charging and discharging current Ic when the RS-FF circuit 33 is reset and outputs an L level frequency modulation signal Sf. Accordingly, the charging voltage Vc of the timing capacitor CT at the first node N1 side decreases and becomes substantially equal to the second reference voltage Vk2, the second comparator circuit 32 outputs an H level second comparison signal Sh2 to the set input terminal of the RS-FF circuit 33. The RS-FF circuit 33 is set and transitions a frequency modulation signal Sf from an L level to an H level when an H level first comparison signal Sh1 is input. The RS-FF circuit 33 repeats output of an H level and an L level frequency modulation signals Sf as described above.

Thus, the RS-FF circuit 33 changes a cycle in which the frequency modulation signal Sf turns on and off according to a current value of a current control signal Si from the D/A conversion circuit 22. In other words, the larger the current value of the current control signal Si, the shorter the RS-FF circuit 33 makes the cycle in which the frequency modulation signal Sf turns on and off. Conversely, the smaller the current value of the current control signal Si, the longer the RS-FF circuit 33 makes the cycle in which the frequency modulation signal Sf turns on and off.

In other words, the current-controlled oscillator 23 changes a cycle of the frequency modulation signal Sf according to a modulation pattern of the modulation pattern generator 21. In other words, the current-controlled oscillator 23 generates the frequency modulation signal Sf according to a modulation pattern of the modulation pattern generator 21.

Figure 5:
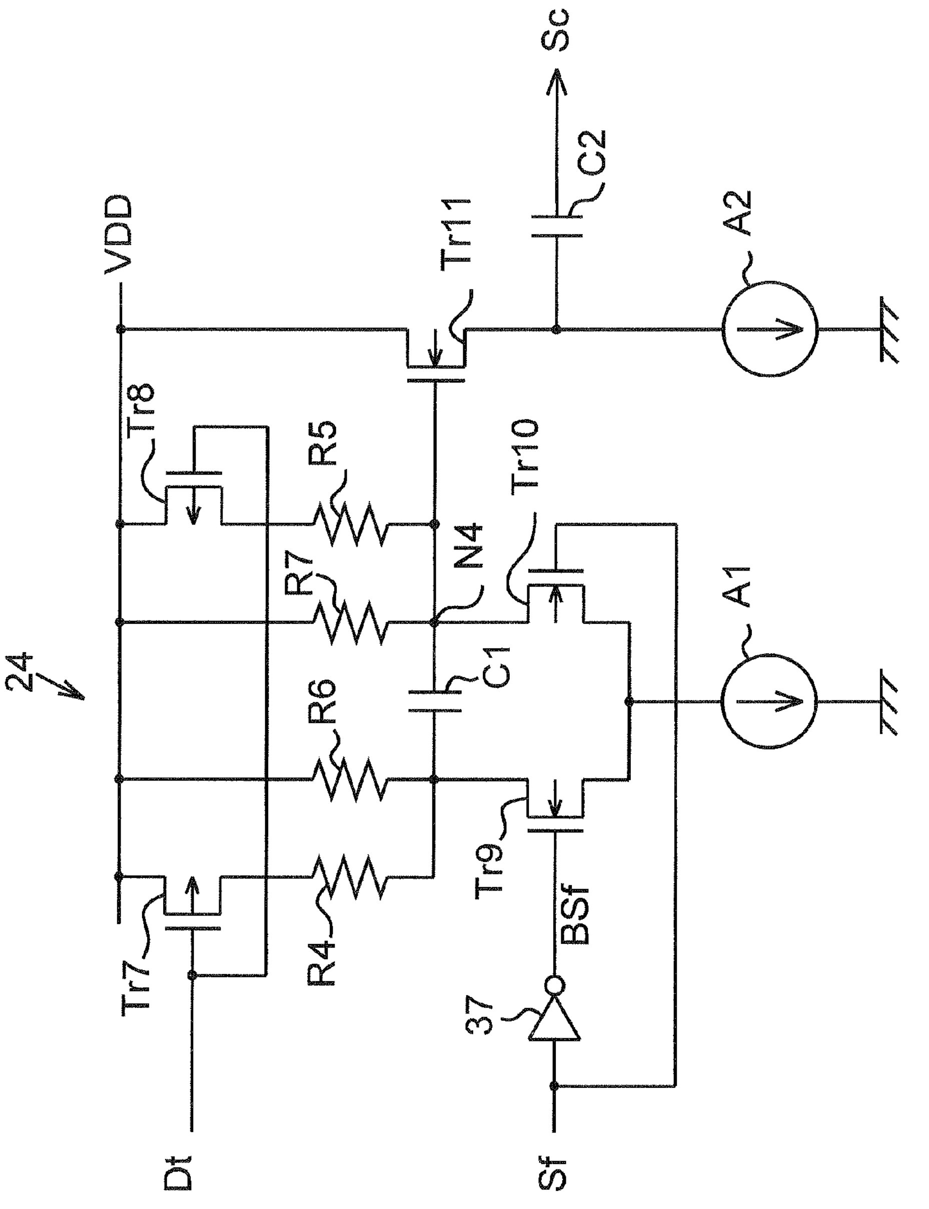
FIG. 5 is a circuit diagram of an ASK modulation circuit according to the first illustration in accordance with aspects of the present invention.

As illustrated in FIG. 5, the ASK modulation circuit 24 includes seventh and eighth transistors Tr7 and Tr8 that are made up of P-channel MOS transistors, fourth to seventh resistors R4 to R7, first and second capacitors C1 and C2, ninth to eleventh transistors Tr9 to Tr11 that are made up of N-channel MOS transistors, first and second current sources A1 and A2, and an inverter circuit 37.

A drain of the seventh transistor Tr7 is coupled to a drain of the ninth transistor Tr9 through the fourth resistor R4, and a source of the seventh transistor Tr7 is supplied with the power supply VDD. The communication control circuit 12 inputs transmission data Dt to a gate of the seventh transistor Tr7. A drain of the eighth transistor Tr8 is coupled to a drain of the tenth transistor Tr10 through the fifth resistor R5 and a source of the eighth transistor Tr8 is supplied with the power supply VDD. The communication control circuit 12 inputs transmission data Dt to a gate of the eighth transistor Tr8.

The ninth transistor Tr9 is supplied with the power supply VDD through the resistor R6. A drain of the ninth transistor Tr9 is coupled to a ground through the first current source A1. The current-controlled oscillator 23 inputs a frequency modulation signal Sf as an inverting frequency modulation signal BSf to a gate of the ninth transistor Tr9 thorough the inverter circuit 37.

The power supply VDD is supplied to a source of the tenth transistor Tr10 through the seventh resistor R7, and a drain of the tenth transistor Tr10 is coupled to a ground through the first current source A1. The current-controlled oscillator 23 inputs a frequency modulation signal Sf to a gate of the tenth transistor Tr10.

In other words, when an H level transmission data Dt is input to gates of the seventh and eighth transistors Tr7 and Tr8, the transistors Tr7 and Tr8 are turned off. Accordingly, the sixth resistor R6 is coupled between the ninth transistor Tr9 and the power supply VDD, and the seventh resistor R7 is coupled between the tenth transistor Tr10 and the power supply VDD. Conversely, when L level transmission data Dt is input to gates of the seventh and the eighth transistors Tr7 and Tr8, the transistors Tr7 and Tr8 are turned on. Accordingly, the parallely-coupled fourth and the sixth resistors R4 and R6 are coupled between the ninth transistor Tr9 and the power supply VDD, while the parallely-coupled fifth and seventh resistors R5 and R7 are coupled between the tenth transistor Tr10 and the power supply VDD.

For example, when resistance values of the fourth to the seventh resistors R4 to R7 are substantially the same, which occurs when an H level transmission data Dt is input, the resistance is coupled between the ninth transistor Tr9 and the power supply VDD and between the tenth transistor Tr10 and the power supply VDD, the value of which is two times greater than the resistance value that is coupled when L level transmission data Dt is input.

Moreover, a first capacitor C1 is coupled between drains of the ninth transistor Tr9 and the tenth transistor Tr10. The first capacitor C1 and the fourth to the seventh resistors R4 to R7 make up a low pass filter as a third filter circuit and thereby reduce harmonics of communication signals Sc.

A drain of the eleventh transistor Tr11 is supplied with the power supply VDD, and a gate of the eleventh transistor Tr11 is coupled to a coupling point (a fourth node N4) of the fifth and seventh resistors R5 and R7 and the tenth transistor Tr10. A source of the eleventh transistor Tr11 is coupled to a ground through the second current source A2, and the eleventh transistor Tr11 outputs a communication signal Sc from the source through the second capacitor C2 to the slave device 2 via the power supply line LV. In other words, the eleventh transistor Tr11 and the second current source A2 that make up an output stage of the ASK modulation circuit 24 is configured as a source follower.

Figure 6:
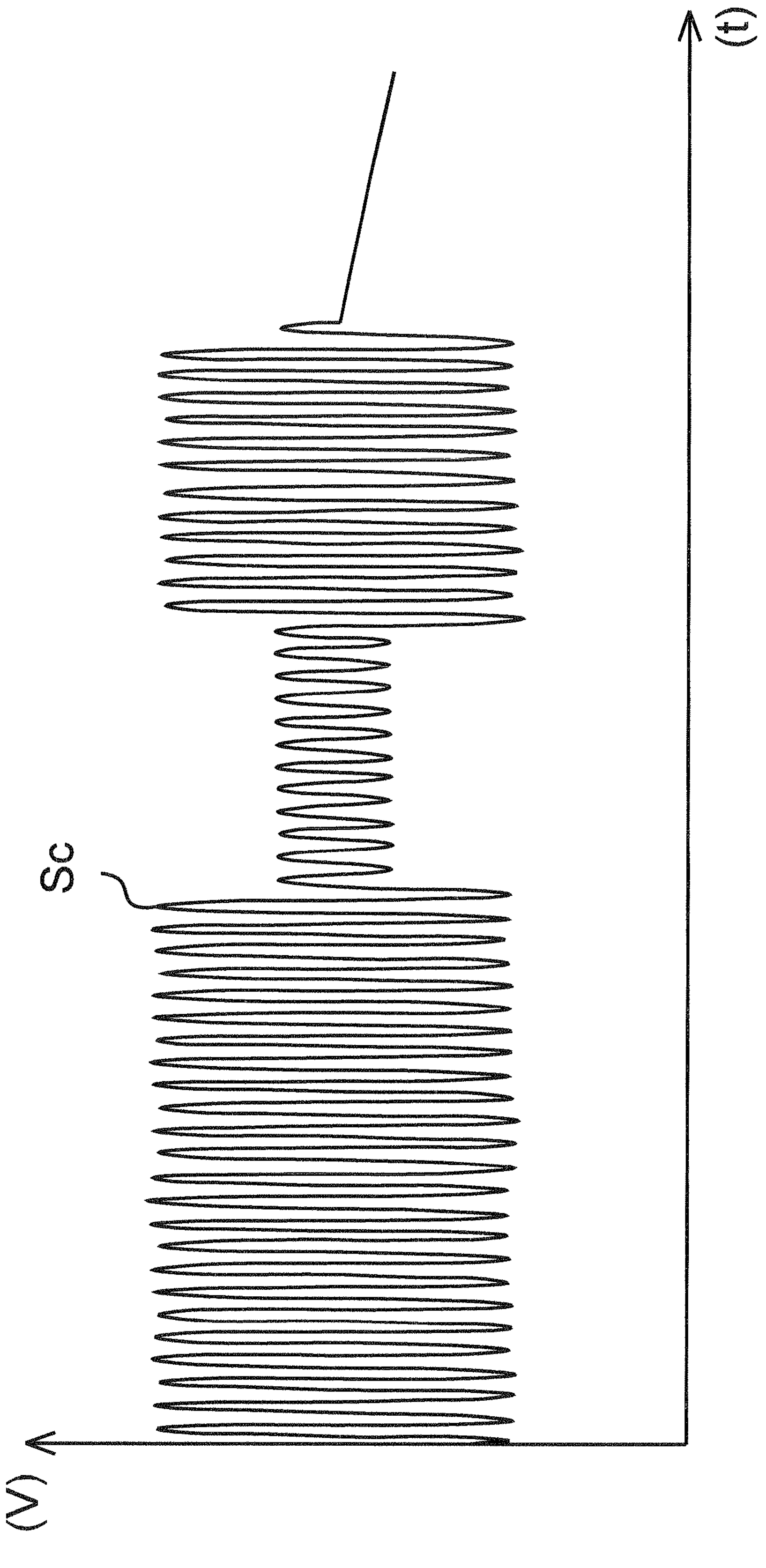
FIG. 6 is an explanatory diagram of the ASK modulation circuit according to the first illustration in accordance with aspects of the present invention.

With the above described configuration, the ASK modulation circuit 24 generates a communication signal Sc by modifying an amplitude of a frequency modulation signal Sf according to transmission data Dt. For example, as illustrated in FIG. 6, the ASK modulation circuit 24 modifies an amplitude of a communication signal Sc according to a resistance value of a resistor coupled between the ninth and tenth transistors, Tr9 and Tr10, and the power supply VDD. In other words, when an H level transmission data Dt is input to the ASK modulation circuit 24, a resistance value of resistors coupled between the ninth and tenth transistors, Tr9 and Tr10, and the power supply VDD becomes larger compared with when an L level transmission data Dt is input. Thus, when H level transmission data Dt is input, the ASK modulation circuit 24 makes an amplitude of the communication signal Sc larger compared with when L level transmission data Dt is input. Consequently, the ASK modulation circuit 24 ASK-modulates a frequency modulation signal Sf as a carrier wave from the current-controlled oscillator 23 based on the transmission data Dt from the communication control circuit 12.

As illustrated in FIG. 3, the reception circuit 14 includes a first and a second band path filters 41 and 42, a frequency modulation (FM) demodulation circuit 43, and an ASK demodulation circuit 44. According to the implementation, the first band-pass filter 41 is a wide-bandwidth band-pass filter, while the second band-pass filter 41 is a narrow-bandwidth band-pass filter.

A communication signal Sc is input to the first band-pass filter 41 from the slave device 2 through the power supply line LV. The first band-pass filter 41 outputs a reception signal Sr that includes a frequency component in a given band included in the input communication signal Sc to the second band-pass filter 42 and the FM demodulation circuit 43.

Figure 7:
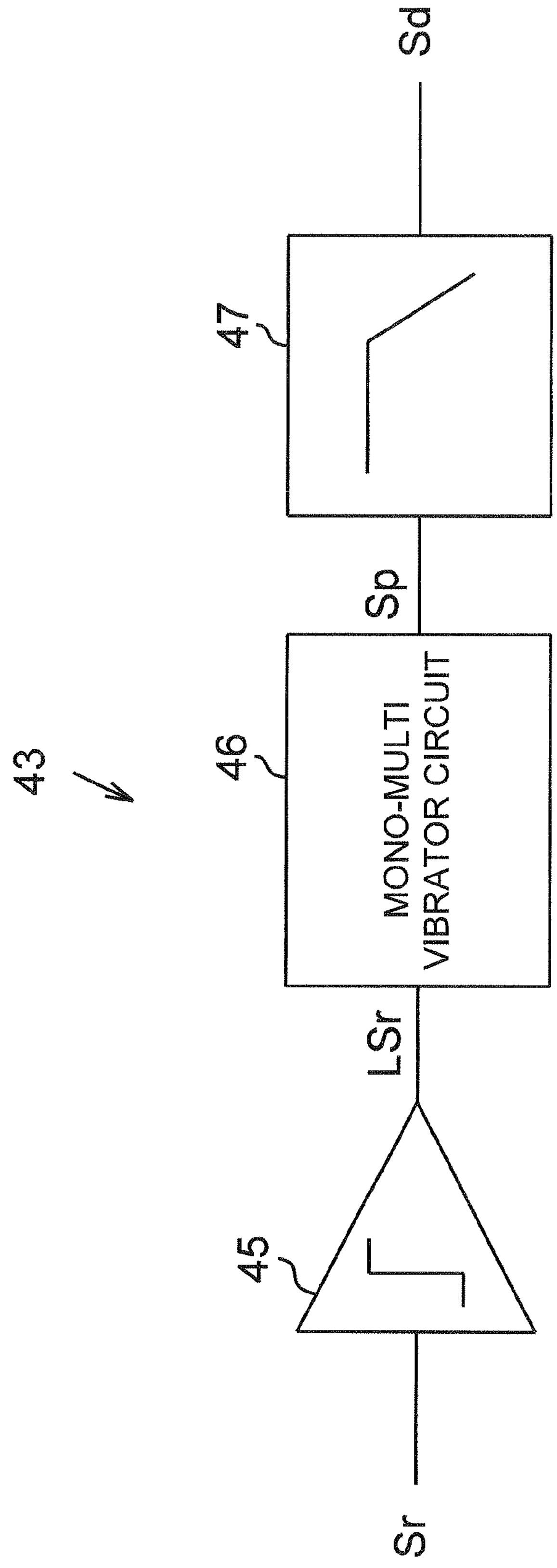
FIG. 7 is a block circuit diagram of an FM demodulation circuit according to the first illustration in accordance with aspects of the present invention.

As illustrated in FIG. 7, the FM demodulation circuit 43 includes a limiting amplifier 45, a mono-multi vibrator circuit (also called a one-shot multi-vibrator) 46 and a low-pass filter 47.

The first band-pass filter 41 inputs a reception signal Sr to the limiting amplifier 45. The limiting amplifier 45 adjusts an amplitude of the input reception signal Sr to a given amplitude (for example, a full amplitude) and outputs as a limiting reception signal LSr to the mono-multi vibrator circuit 46. In other words, the limiting reception signal LSr is input from the slave device 2 through the power supply line LV, and the amplitude changes due to noise or influence from another signal in the power supply line LV. Thus, the limiting amplifier 45 generates the limiting reception signal LSr by adjusting the amplitude of the input reception signal Sr to a given amplitude.

The limiting amplifier 45 inputs the limiting reception signal LSr to the mono-multi vibrator circuit 46. The mono-multi vibrator circuit 46 is set when an H level limiting reception signal LSr is input, and outputs an H level pulse signal Sp to a low-pass filter 47 for a given amount of time. After a given amount of time elapses, the mono-multi vibrator circuit 46 returns to a reset state and outputs an L level pulse signal Sp to the low-pass filter 47. In other words, the mono-multi vibrator circuit 46 is a pulse generator that outputs an on-pulse with a given pulse width (an H level pulse signal Sp) to the low-pass filter 47 in response to an H level limiting reception signal LSr.

Figure 8A:
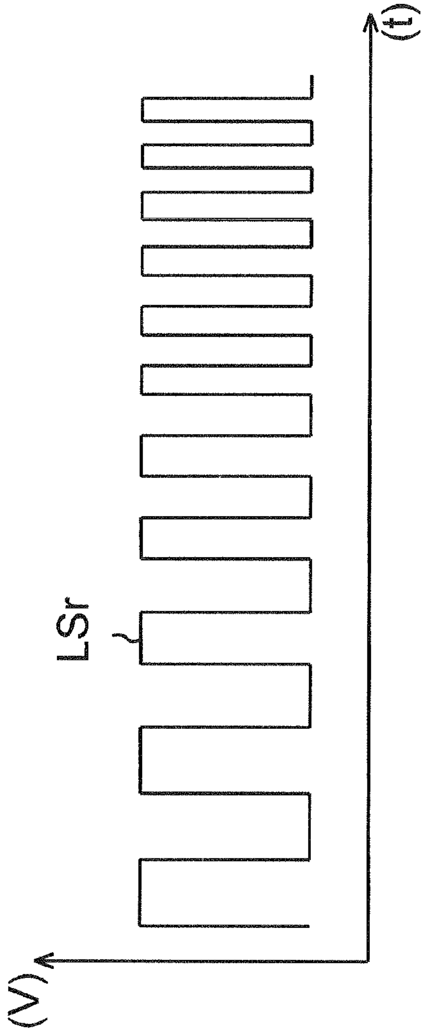
FIGS. 8A and 8B are explanatory diagrams of the FM demodulation circuit according to the first illustration in accordance with aspects of the present invention.
Figure 8B:
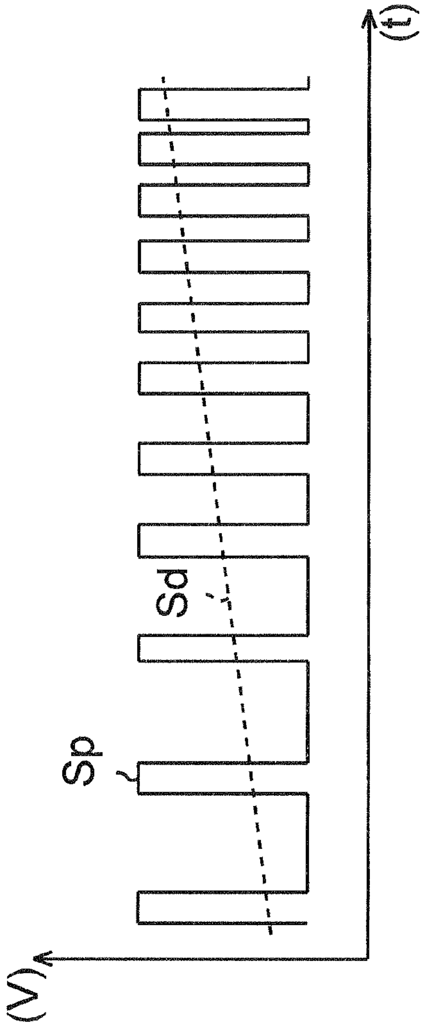

In other words, the mono-multi vibrator circuit 46 makes the limiting reception signal LSr that is FM-modulated by the transmission circuit 13 and the frequency is shifted as illustrated in FIG. 8A into an on-pulse with a given pulse width (H level pulse signal Sp) for each cycle of the limiting reception signal LSr as illustrated in FIG. 8B.

The mono-multi vibrator circuit 46 inputs a pulse signal Sp to the low-pass filter 47. As illustrated in FIG. 8B, the low-pass filter 47 smoothes the input pulse signal Sp and outputs to the second band pass filter 42 and the power supply circuit unit 15 as a frequency demodulation signal Sd.

In other words, the low-pass filter 47 changes a voltage value of a frequency demodulation signal Sd according to a cycle of a pulse signal Sp. This means that the longer the cycle of the pulse signal Sp is, the lower the low-pass filter 47 makes a voltage value of the frequency demodulation signal Sd. Conversely, the shorter the cycle of the pulse signal Sp is, the higher the low-pass filter 47 makes a voltage value of the frequency demodulation signal Sd.

In other words, the lower the carrier frequency of the communication signal Sc, the lower the low-pass filter 47 makes a voltage value of a frequency demodulation signal Sd. Conversely, the higher the carrier frequency of the communication signal Sc, the higher the low-pass filter 47 makes a voltage value of a frequency demodulation signal Sd.

Therefore, the FM demodulation circuit 43 demodulates the communication signal Sc that is FM-demodulated by the slave device 2 and converts the frequency of the communication signal Sc into a voltage value of the frequency demodulation signal Sd.

Figure 9:
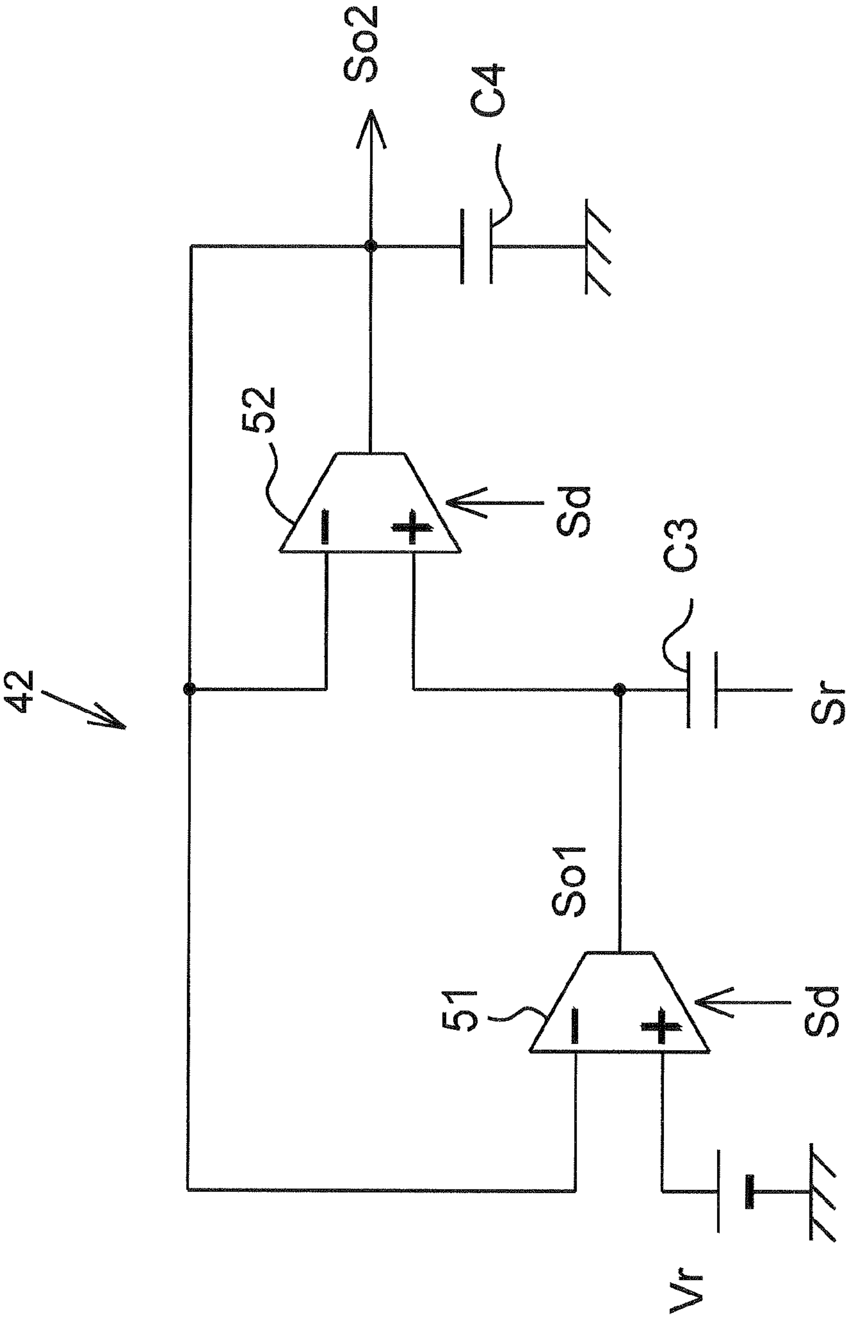
FIG. 9 is a circuit diagram of a second band-pass filter according to the first illustration in accordance with aspects of the present invention.

The second band-pass filter 42 is a gm-C band-pass filter and as illustrated in FIG. 9, includes a first and a second voltage current conversion circuits (also called a trans conductance amplifier or an operational transcondactance amplifier (OTA)) 51 and 52, and a third and a fourth capacitor C3 and C4.

An inverting input terminal of the first voltage current conversion circuit 51 is coupled to an inverting input terminal and an output terminal of the second voltage current conversion circuit 52. A non-inverting input terminal of the first voltage current conversion circuit 51 is coupled to a ground. Moreover, the FM demodulation circuit 43 inputs a frequency demodulation signal Sd to the voltage current conversion circuit 51

A non-inverting input terminal of the second voltage current conversion circuit 52 is coupled to an output terminal of the first voltage current conversion circuit 51. The first band-pass filter 41 inputs a reception signal Sr to the second voltage current conversion circuit 52 through the third capacitor C3. Furthermore, the FM demodulation circuit 43 inputs a frequency demodulation signal Sd to the voltage current conversion circuit 52.

With the above described configuration, the second band-pass filter 42 selects a pass-band for a carrier frequency of the communication signal Sc according to the frequency demodulation signal Sd. The second band-pass filter 42 outputs the selected pass-band included in the communication signal Sc to the ASK demodulation circuit 44 as a second output signal So2.

For example, when the voltage value of the frequency demodulation signal Sd is higher, the second band-pass filter 42 makes the pass-band higher. Conversely, as the voltage value of the frequency demodulation signal Sd decreases, the second band-pass filter 42 lowers the pass-band. In other words, when the carrier frequency of the communication signal Sc is higher, the second band band-pass filter 42 makes the pass-band higher, whereas when the carrier frequency of the communication signal sc is lower, the second band band-pass filter 42 makes the pass-band lower.

In other words, the second band-pass filter 42 tracks the pass-band to the carrier frequency of the communication signal Sc and functions as a tracking band pass filter.

A circuit configuration of the above described first voltage current conversion circuit 51 will be described by referring to FIG. 10. The second voltage current conversion circuit 52 has substantially the same circuit configuration as that of the first voltage current conversion circuit 51. Thus, the circuit configuration of the second voltage current conversion circuit 52 will not be described for convenience of the description.

Figure 10:
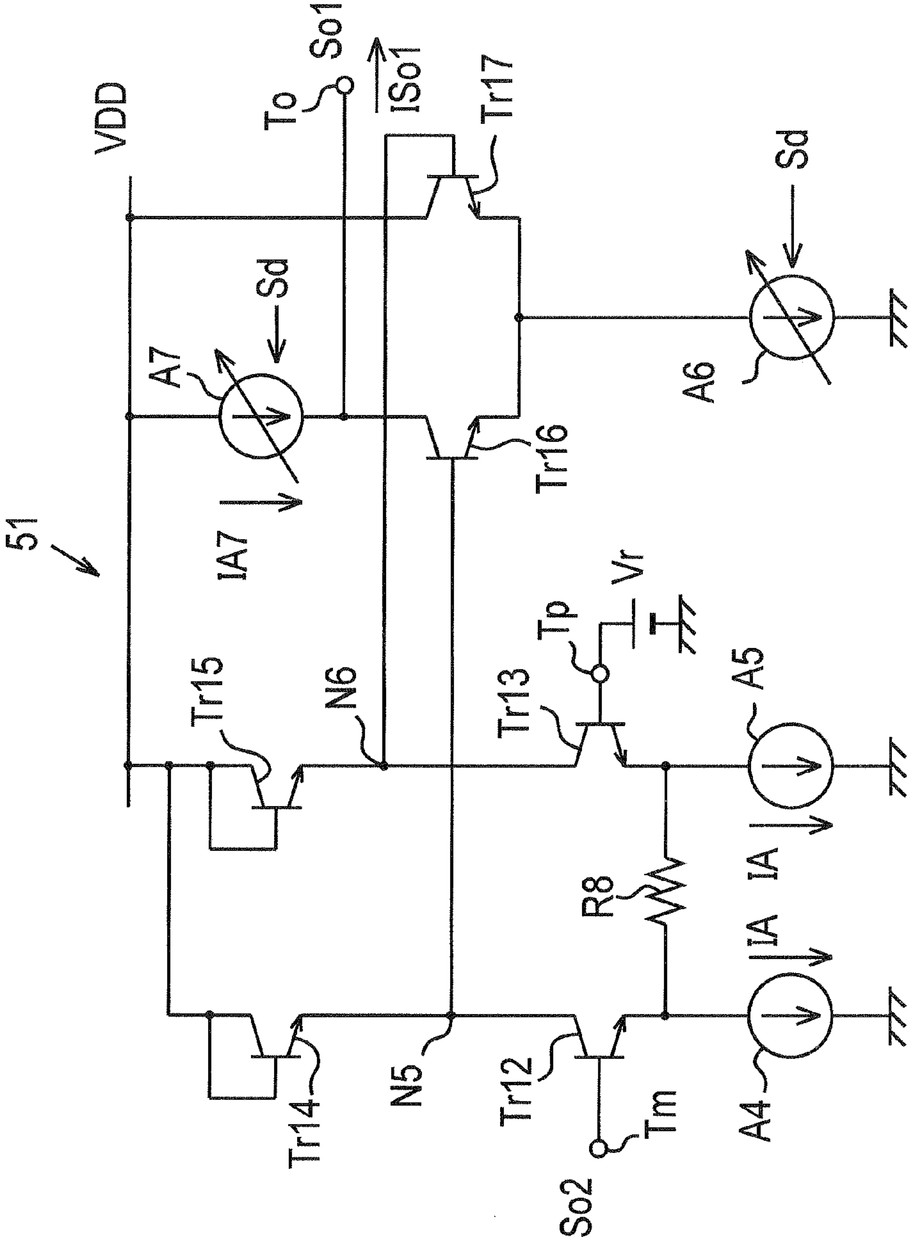
FIG. 10 is a circuit diagram of a voltage current conversion circuit according to the first illustration in accordance with aspects of the present invention.
Figure 11:
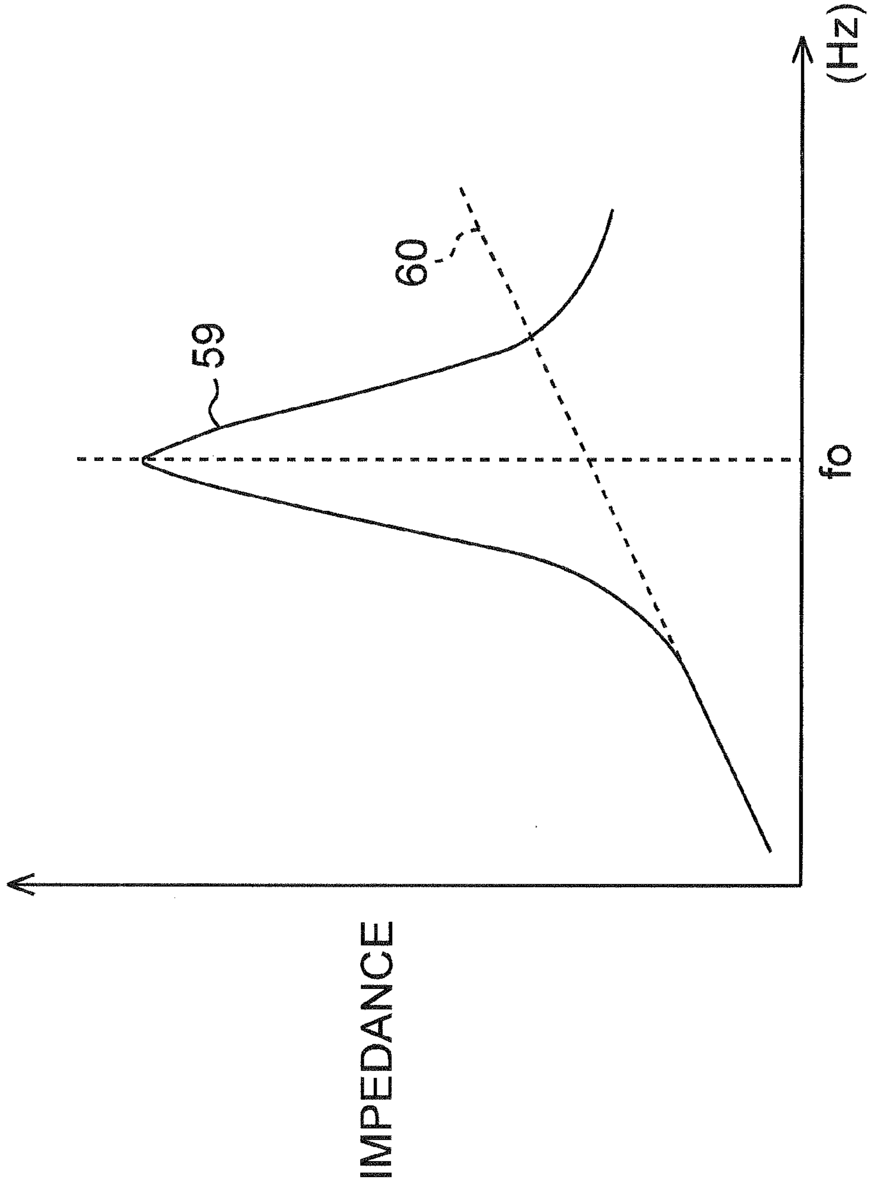
FIG. 11 illustrates a parallel resonance circuit according to the first illustration in accordance with aspects of the present invention.

As illustrated in FIG. 10, the first voltage current conversion circuit 51 includes twelfth to seventeenth transistors Tr12 to Tr17 that are made up of npn bipolar transistors and fourth to seventh current power sources A4 to A7 and an eighth resistor R8.

An emitter of the twelfth transistor Tr12 is coupled to a ground through the fourth current source A4, and coupled to an emitter of the thirteenth transistor Tr13 through the eighth resistor R8. A collector of the twelfth transistor Tr12 is coupled to an emitter of the fourteenth transistor Tr14. A second output signal So2 is input to a base of the twelfth transistor Tr12 through an inverting input terminal Tm.

An emitter of the thirteenth transistor Tr13 is coupled to a ground through the fifth current source A5, and a collector of the thirteenth transistor Tr13 is coupled to an emitter of the transistor Tr15. A reference voltage Vr (for example, VDD/2) is supplied to a base of the thirteenth transistor Tr13 through a non-inverting input terminal Tp. Values of the currents that the fourth and the fifth current sources, A4 and A5, flow are the substantially the same.

A base and a collector of the fourteenth transistor Tr14 are coupled and the power supply VDD is supplied to the fourteenth transistor Tr14. A base and a collector of the fifteenth transistor Tr15 are coupled, and the power supply VDD is supplied to the fifteenth transistor Tr15.

An emitter of the sixteenth transistor Tr16 is coupled to a ground through the sixth current source A6, and a base of the sixteenth transistor Tr16 is coupled to a fifth node N5. The power supply VDD is supplied to a collector of the sixteenth transistor Tr16 through the seventh current source A7, and the sixteenth transistor Tr16 outputs a first output signal So1 from a collector thereof to a non-inverting input terminal of the second voltage current conversion circuit 52 through the output terminal To.

The sixth current source A6 is set so as to flow a current twice as large as a current of the seventh current source A7. The FM demodulation circuit 43 inputs a frequency demodulation signal Sd to the sixth current source A6 and the seventh current source A7 respectively. The sixth current source A6 and the seventh current source A7 increase or decrease current values according to the input frequency demodulation signals Sd while retaining a ratio of the sixth current source A6 and the seventh current source A7. In other words, when the voltage value of the frequency demodulation signal Sd increases, the sixth current source A6 and the seventh current source A7 increase values of flowing currents. Conversely, when the voltage value of the frequency demodulation signal Sd is reduced, the sixth current source A6 and the seventh current source A7 decrease values of flowing currents. An emitter of the seventeenth transistor Tr17 is coupled to a ground through the sixth current source A6, and a collector of the seventeenth transistor Tr17 is supplied with the power supply VDD. A base of the seventeenth transistor Tr17 is coupled to a sixth node N6.

With the above described configuration, a current value ISo1 of the first output signal So1 that is output from the output terminal To of the first voltage current conversion circuit 51 is expressed by:

$$Iso1=(IA7/IA)\times[Vin/(R8+2\times re)]$$

In the above expression, "IA7" indicates a current value of the seventh current source A7, "IA" is current values of the fourth current source A4 and the fifth current source A5, "Vin" indicates a voltage difference between the voltage value of the second output signal So2 and the reference voltage Vr, and "re" indicates resistance values of small-signal emitter resistances of the twelfth and thirteenth transistors Tr12 and Tr13.

In other words, a transconductance gm of the first voltage current conversion circuit 51 is expressed by:

$$gm=(IA7/IA)\times[1/(R8+2\times re)]$$

In other words, the first voltage current conversion circuit 51 changes a current value of the first output signal So1 that is output from the output terminal To according to a voltage difference between the second output signal So2 and the reference voltage Vr. This means that the larger the voltage difference between the second output signal So2 and the reference voltage Vr, the higher the first voltage current conversion circuit 51 increases a current value of the first output signal So1 that is output from the output terminal To. Conversely, the smaller the voltage difference between the second output signal So2 and the reference voltage Vr, the lower the first voltage current conversion circuit 51 decreases a current value of the first output signal So1 that is output from the output terminal To.

The first voltage current conversion circuit 51 changes a current value of the first output signal So1 that is output from the output terminal To according to a frequency demodulation signal Sd from the FM demodulation circuit 43. In other words, the larger the voltage value of the frequency demodulation signal Sd, the higher the first voltage current conversion circuit 51 increases a current value of the first output signal So1 that is output from the output terminal To. Conversely, the smaller the voltage value of the frequency demodulation signal Sd, the lower the first voltage current conversion circuit 51 decreases the current value of the first output signal So1 that is output from the output terminal To.

With the above described first and second band-pass filters 41 and 42, in the reception circuit 14, the first band-pass filter 41 passes all frequency bands that are shifted by FM modulating a communication signal Sc by the slave device 2. The second band-pass filter 42 changes a pass-band according to a carrier frequency of a shifting communication signal Sc, and let mostly the carrier frequency of the shifting communication signal Sc pass through. The FM demodulation circuit 43 demodulates a reception signal Sr from the first band-pass filter 41. In other words, in order to FM-demodulate the communication signal Sc with high accuracy, the FM demodulation circuit 43 FM-demodulates the reception signal Sr that is the communication signal Sc pass through the first band-pass filter 41 with the pass-band shifted by FM-modulating the communication signal Sc by the slave device 2.

The second band-pass filter 42 inputs a second output signal So2 to the ASK demodulation circuit 44. The ASK demodulation circuit 44 ASK-demodulates the input second output signal So2 and outputs a transmission Dt from the slave device 2 to the communication control circuit 12.

The power supply circuit unit 15 includes a power supply circuit 55, an A/D conversion circuit 56, a selection circuit 57, and a parallel resonance circuit 58.

The power supply circuit 55 supplies a power supply VDD to the slave device 2 through the parallel resonance circuit 58.

The reception circuit 14 (FM demodulation circuit 43) inputs a frequency demodulation signal Sd to the A/D conversion circuit 56. The A/D conversion circuit 56 converts the input frequency demodulation signal Sd that is an analog value into a frequency demodulation data Dd that is a digital value and outputs to the selection circuit 57.

The A/D conversion circuit 56 inputs the frequency demodulation signal Dd to the selection circuit 57. The modulation pattern generator 21 inputs a modulation pattern data Dm to the selection circuit 57. The selection circuit 57 selects frequency demodulation data Dd or modulation pattern data Dm according to an input communication control signal Se and outputs to the parallel resonance circuit 58 as frequency control signal Ss. In other words, the selection circuit 57 selects the modulation pattern data Dm from the modulation pattern generator 21 and outputs to the parallel resonance circuit 58 as a frequency control signal Ss when an H level communication control signal Se (transmitted by the host device 1) is input. Conversely, the selection circuit 57 selects the frequency demodulation data Dd from the A/D conversion circuit 56 and outputs to the parallel resonance circuit 58 as a frequency control signal Ss when an L level communication control signal (transmitted by the host device 1) is input.

The parallel resonance circuit 58 is configured with a parallel circuit that is made up of a coil L1 and a variable capacitor CL. As indicated by the solid line 59 in FIG. 11, impedance of the parallel resonance circuit 58 is substantially maximized at parallel resonance frequency fo, and the impedance becomes smaller the further away from the parallel resonance frequency fo. As indicated by the dashed line 60 in FIG. 11, an impedance of one coil increases proportional to a frequency. Thus, the parallel resonance circuit 58 may achieve a given impedance by a coil smaller than the one coil.

The selection circuit 57 inputs a frequency control signal Ss to the parallel resonance circuit 58. The parallel resonance circuit 58 changes the resonance frequency fo according to the input frequency control signal Ss. In other words, when the host device 1 transmits a communication control signal Sc, the parallel resonance circuit 58 adjusts the resonance frequency fo to a carrier frequency of a communication signal Sc transmitted by the host device 1 according to a modulation pattern data Dm as a frequency control signal Ss. On the other hand, when the host device 1 receives the communication signal Sc, the parallel resonance circuit 58 adjusts the resonance frequency fo to a carrier frequency of the communication signal Sc received by the host device 1 according to a frequency demodulation data Dd as a frequency control signal Ss.

In other words, the parallel resonance circuit 58 substantially maximizes an impedance at a carrier frequency of the communication signal Sc by adjusting the resonance frequency fo to the carrier frequency of the communication signal Sc that is transmitted to and received from the host device 1. Hence, the parallel resonance circuit 58 reduces amplitude of the carrier frequency of the communication signal Sc that is input to the power supply circuit 55 through the power supply line LV. Further, the parallel resonance circuit 58 changes a resonance frequency fo according to a shift of a carrier frequency of the communication signal Sc, thus amplitude of a carrier frequency of a communication signal Sc that is input through the power supply line LV may be reduced even when carrier frequencies of the communication signal Sc is shifted.

Figure 12:
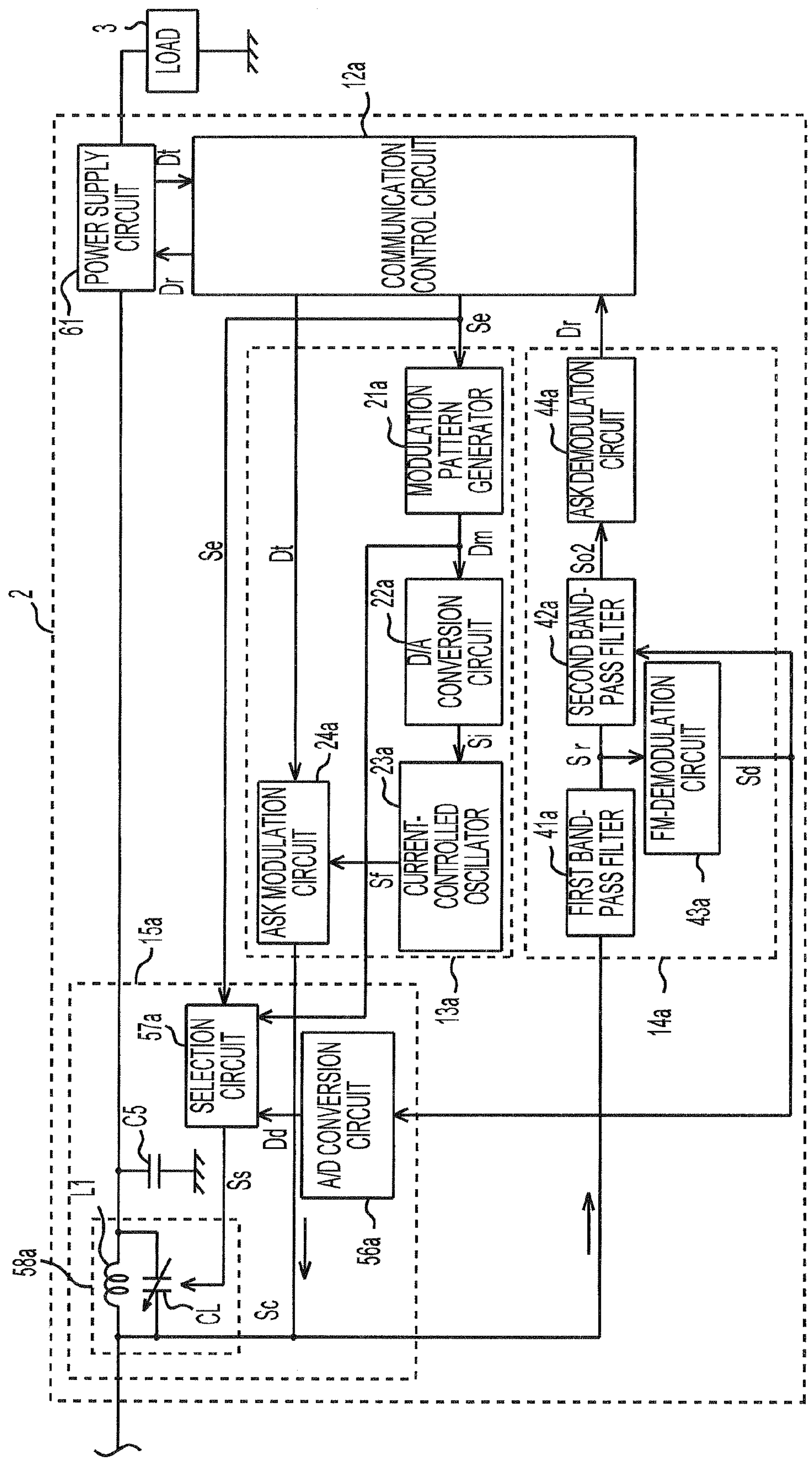
FIG. 12 is a block circuit diagram of the slave device according to the first illustration in accordance with aspects of the present invention.

As illustrated in FIG. 12, the slave device 2 is configured by removing the controller 11 and the power supply circuit 55 from the configuration of the host device 1 and adding a power supply control circuit 61 for driving a load 3, and a fifth capacitor C5 for reducing a voltage fluctuation of the power supply line LV to the configuration of the host device 1. Moreover, operation of the communication control circuit 12*a* of the slave device 2 is different from that of the communication control circuit 12 of the host device 1. Other elements of the configuration of the slave device 2 are substantially the same as the elements of the host device 1. Therefore, elements that are substantially the same as those illustrated in FIG. 3 are indicated by attaching a suffix “a”, and the elements will not be explained.

The host device 1 supplies a power supply VDD to the power supply control circuit 61. Reception data Dr that is data received from the host device 1 is input to the power supply control circuit 61 through the communication control circuit 12*a*. The power supply control circuit 61 drives and controls the load 3 according to the input reception data Dr. The reception data Dr in which the host device 1 requests data is input to the power supply control circuit 61 through the communication control circuit 12*a*. The power supply control circuit 61 outputs transmission data Dt that includes data requested by the host device 1 to the communication control circuit 12*a* based on the reception data Dr.

The communication control circuit 12*a* outputs, as an initial setting, an L level communication signal Se for receiving a communication signal Sc from the host device 1 to the transmission circuit 13*a* and the power supply circuit unit 15*a*. The reception circuit 14*a* inputs reception data Dr that is received from the host device 1 to the communication control circuit 12*a*. The communication control circuit 12*a* outputs the input reception data Dr to the power supply control circuit 61.

The power supply control circuit 61 inputs transmission data Dt to be transmitted to the host device 1 to the communication control circuit 12*a*. The communication control circuit 12*a* outputs an H level communication signal Se for making the host device 1 transmit a communication signal Sc, and transmission data Dt to be transmitted to the host device 1 to the transmission circuit 13*a*. The communication control circuit 12*a* outputs an H level communication control signal Se for making the host device 1 transmit a communication signal Sc to the power supply circuit unit 15*a*.

The communication control circuit 12*a* returns to the initial setting and outputs an L level communication control signal Se for receiving a communication signal Sc from the host device 1 to the transmission circuit 13*a* and the power supply circuit unit 15*a*. In other words, the slave device 2 is in a state to receive a communication signal Sc from the host device 1 as a normal operation.

As described above, according to the implementation, the following effects may be achieved.

(1) The current-controlled oscillators 23 and 23*a* FM-demodulate a carrier wave of a communication signal Sc based on a modulation pattern stored in the modulation pattern generator 21. The parallel resonance circuits 58 and 58*a* of power supply circuit units 15 and 15*a* change a parallel resonance frequency fo according to a shift of a carrier frequency of the communication signal Sc.

Accordingly, a noise level of noise radiation due to communication signal Sc from the power supply line LV may be reduced because a carrier frequency of the communication signal Sc shifts. Moreover, impedances of the parallel resonance circuits 58 and 58*a* may be substantially maximized at a carrier frequency of the communication signal Sc. Thus, the coil L1 of the parallel resonance circuits 58 and 58*a* may reduce a voltage level of communication signal Sc of a carrier frequency to a given voltage level even when an inductance value is small.

(2) The second band-pass filters 42 and 42*a* change a pass-band for letting the reception signal Sr pass according to a shift of a carrier frequency of the communication signal Sc. Hence, the second band-pass filters 42 and 42*a* let the carrier frequency of the communication signal Sc pass through even when the carrier frequency of the communication signal Sc shifts as described above.

(3) The FM demodulation circuits 43 and 43*a* are input with the reception signals Sr from the first band-pass filters 41 and 41*a* respectively, and FM-demodulates the reception signals Sr to generate frequency demodulation signals Sd. Therefore, FM demodulation with high accuracy may be achieved because the FM demodulation circuits 43 and 43*a* FM-demodulate the reception signal Sr that the first band-pass filters 41 and 41*a* let pass through the shifting pass-band of the communication signal Sc.

Second Embodiment

Hereunder, a second exemplary implementation will be described by referring to FIGS. 13 and 14.

In the first implementation, the FM demodulation circuits 43 and 43*a* recognize carrier frequencies of the communication signals Sc based on frequency demodulation signals Sd that are obtained by FM demodulating the communication signals Sc received thorough the first band-pass filters 41 and 41*a*.

According to the second implementation, a host device 1*a* and a slave device 2*a* transmit data of a carrier frequency of a communication signal Sc as transmission data Dt together with data to be transmitted.

Hereunder, points that are different from the first implementation will be mainly described. In the host device is according to the second implementation illustrated in FIG. 13, a setting circuit 71 of the communication control circuit 12 is added to and the FM demodulation circuit 43 is removed from the host device 1 according to the host device 1 illustrated in FIG. 3. Similarly, in the slave device 2*a* according to the second implementation illustrated in FIG. 14, a setting circuit 71*a* of the communication control circuit 12*a* is added to and the FM demodulation circuit 43*a* is removed from the slave device 2 according to the first implementation illustrated in FIG. 12. The same reference numerals are applied to elements that are substantially the same elements as those illustrated in FIGS. 1 to 12, and the elements will not be explained for convenience of description.

Figure 13:
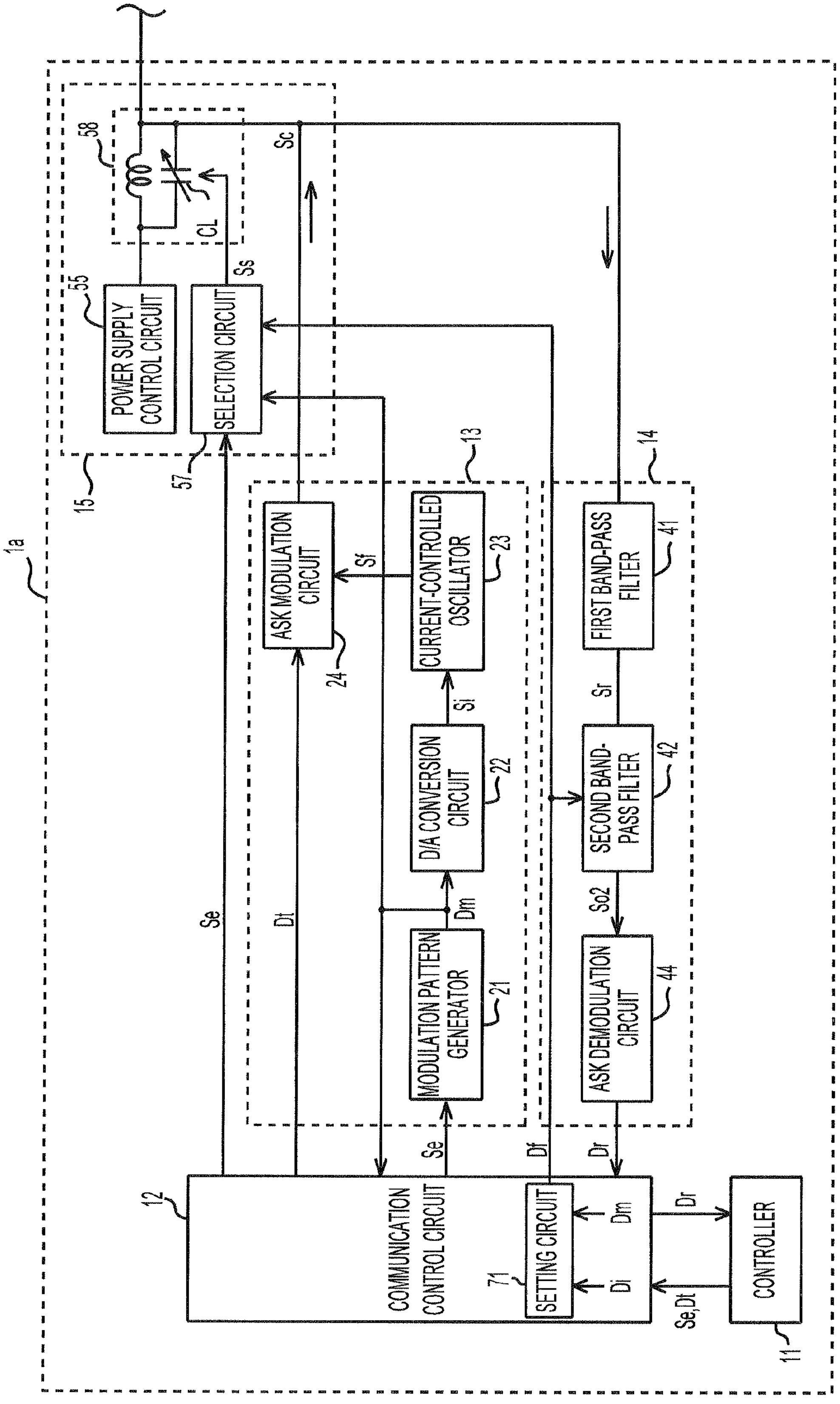
FIG. 13 is a block circuit diagram of a host device according to a second illustration in accordance with aspects of the present invention.

As illustrated in FIG. 13, when a communication signal Sc is transmitted to the slave device 2*a*, a modulation pattern generator 21 inputs pattern data Dm as data of a carrier frequency of a communication signal to the communication control circuit 12. The communication control circuit 12 outputs the modulation pattern data Dm to an ASK modulation circuit 24 as transmission data Dt together with data to be transmitted.

When the setting circuit 71 of the communication circuit 12 receives the communication signal Sc from the slave device 2*a*, the modulation pattern data Dm obtained by demodulating the communication signal Sc received from the slave device 2*a*, and initial frequency data Di as an initial value are input to the setting circuit 71. When the setting circuit 71 receives the communication signal Sc from the slave device 2*a* for the first time, the setting circuit 71 outputs the initial frequency data Di to the second band-pass filter 42 and a selection circuit 57 as frequency data Df.

The second band-pass filter 42 changes a pass-band for letting a reception signal Sr pass through according to the input frequency data Df. The selection circuit 57 selects and outputs the input modulation pattern data Dm to the parallel resonance circuit 58 as a frequency control signal Ss. The parallel resonance circuit 58 adjusts a parallel resonance frequency fo to the carrier frequency of the communication signal Sc according to the input frequency control signal Ss.

In other words, when the communication signal Sc is received from the slave device 2*a* for the first time, if a pass-band that the second band-pass filter 42 let the reception signal Sr pass through is significantly different from the carrier frequency of the received communication signal Sc, the received communication signal Sc is attenuated. Consequently, the reception circuit 14 may not obtain modulation pattern data Dm by demodulating the received communication signal Sc. Moreover, when parallel resonance frequency fo of the parallel resonance circuit 58 is significantly different from the carrier frequency of the received communication signal Sc, the communication signal Sc may be supplied to the power supply circuit 55 thorough the power supply line LV.

Thus, when a communication signal Sc is received for the first time, the setting circuit 71 outputs initial frequency data Di that is a given carrier frequency of a communication signal Sc set as an initial value to the second band-pass filter 42 and the selection circuit 57 as frequency data Df.

When the setting circuit 71 receives the communication signal Sc from the slave device 2*a* for the first time, the setting circuit 71 outputs modulation pattern data Dm obtained by demodulating the communication signal Sc received from the slave device 2*a* to the second band-pass filter 42 and the selection circuit 57 as frequency data Df.

Figure 14:
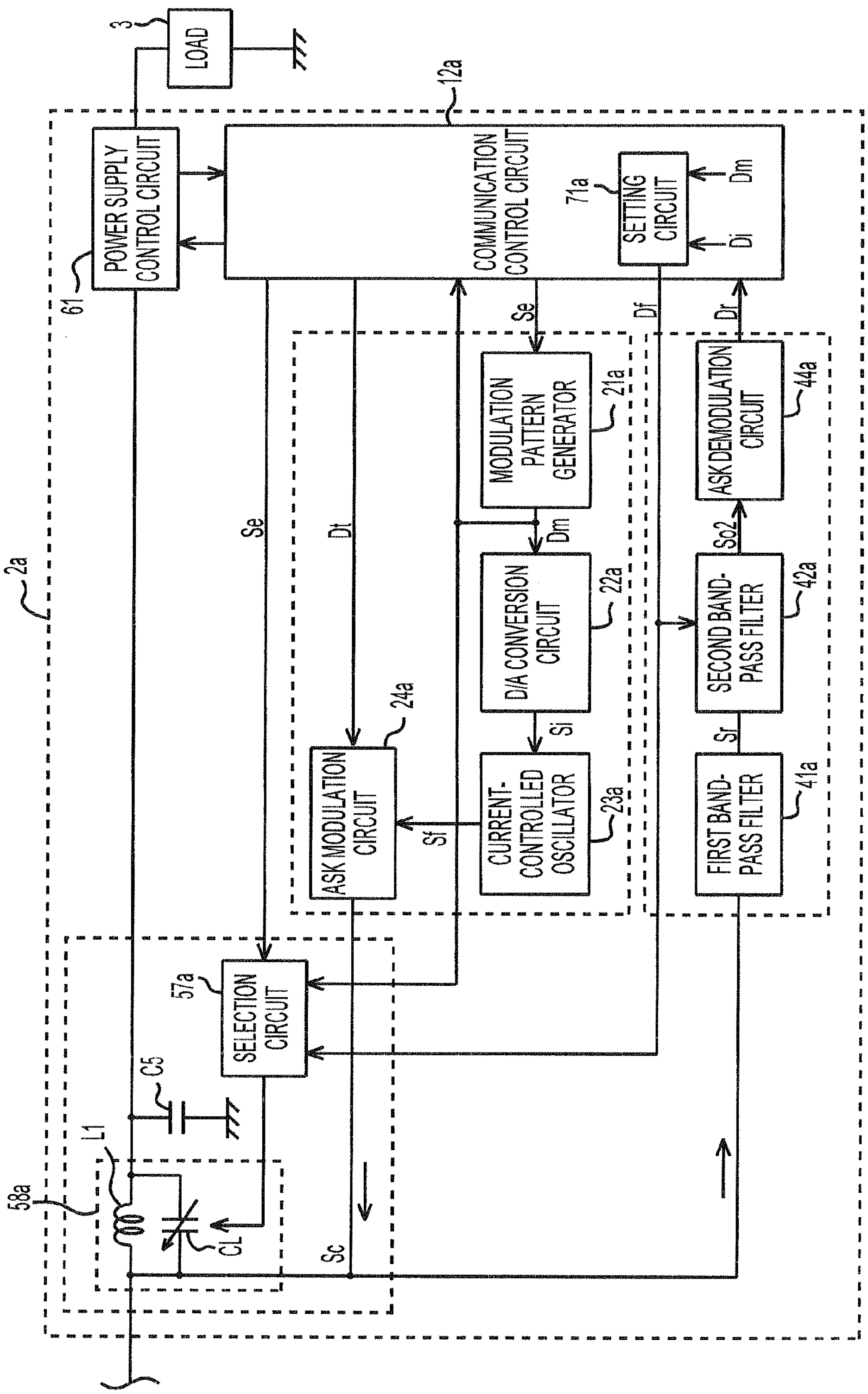
FIG. 14 is a block circuit diagram of a slave device according to the second illustration in accordance with aspects of the present invention.

As illustrated in FIG. 14, the slave device 2*a* applies substantially the same changes as those applied by the above described host device 1*a*. Hence, a suffix "a" is applied to elements that are substantially the same as those illustrated in FIG. 13, and the elements will not be described in detail.

As described above, according to the implementation, the following effects may be achieved.

(1) The host device is transmits transmission data Dt that includes data of a carrier frequency of a communication signal Sc to be transmitted to the slave device 2*a*. The slave device 2*a* transmits transmission data Dt that includes data of the carrier frequency of the communication signal Sc to be transmitted to the host device 1*a*.

Therefore, the host device 1*a* and the slave device 2*a* may recognize a carrier frequency of the communication signal Sc to be received without using the FM demodulation circuits 43 and 43*a*. As a result, the host device 1*a* and the slave device 2*a* may reduce the circuit size for the amount of the FM demodulation circuits 43 and 43*a*.

The above aspects may be achieved by the following implementations.

According to the above described implementation, the current-controlled oscillators 23 and 23*a* are used for generating carrier wave of the communication signal. However, a circuit for generating a carrier wave of the communication signal is not limited to the above described circuit as long as a carrier wave may be FM-demodulated based on a modulation pattern stored onto the modulation pattern generators 21 and 21*a*.

For example, a carrier wave may be FM-demodulated by controlling a capacitance value and a resistance value using a CR oscillator. Further, a carrier wave that is FM modulated directly by a logic circuit may be generated.

According to the implementation, the ASK modulation circuits 24 and 24*a* reduce a voltage level of harmonics of a communication signal Sc by configuring a low-pass filter with the first capacitor C1, and the fourth to the seventh resistors R4 to R7. However, the reduction method is not limited to this but a capacitance value of the first capacitor C1 may be changed so that a cut off frequency according to a shift of the carrier frequency of the communication signal Sc is obtained.

Accordingly, even if a carrier frequency of the communication signal Sc shifts, a voltage level of harmonics of a communication signal Sc may be reduced by the low-pass filter that is configured with the first capacitor C1, and the fourth to the seventh resistors R4 to R7.

According to the implementation, the second band-pass filters 42 and 42*a* use the circuit illustrated in FIG. 9. However, the circuit is not limited to this, and any band-pass filter (for example, an active filter or a passive filter) may be used that changes a pass-band for letting a reception signal Sr pass through based on a frequency demodulation signal Sd according to the first implementation, and based on the frequency data Df according to the second implementation.

According to the implementation, the FM demodulation circuits 43 and 43*a* use a circuit illustrated in FIG. 4. However, the circuit is not limited to this, and any circuit configuration may be used for the FM demodulation circuits 43 and 43*a* as long as the reception signal Sr may be demodulated.

Figure 15:
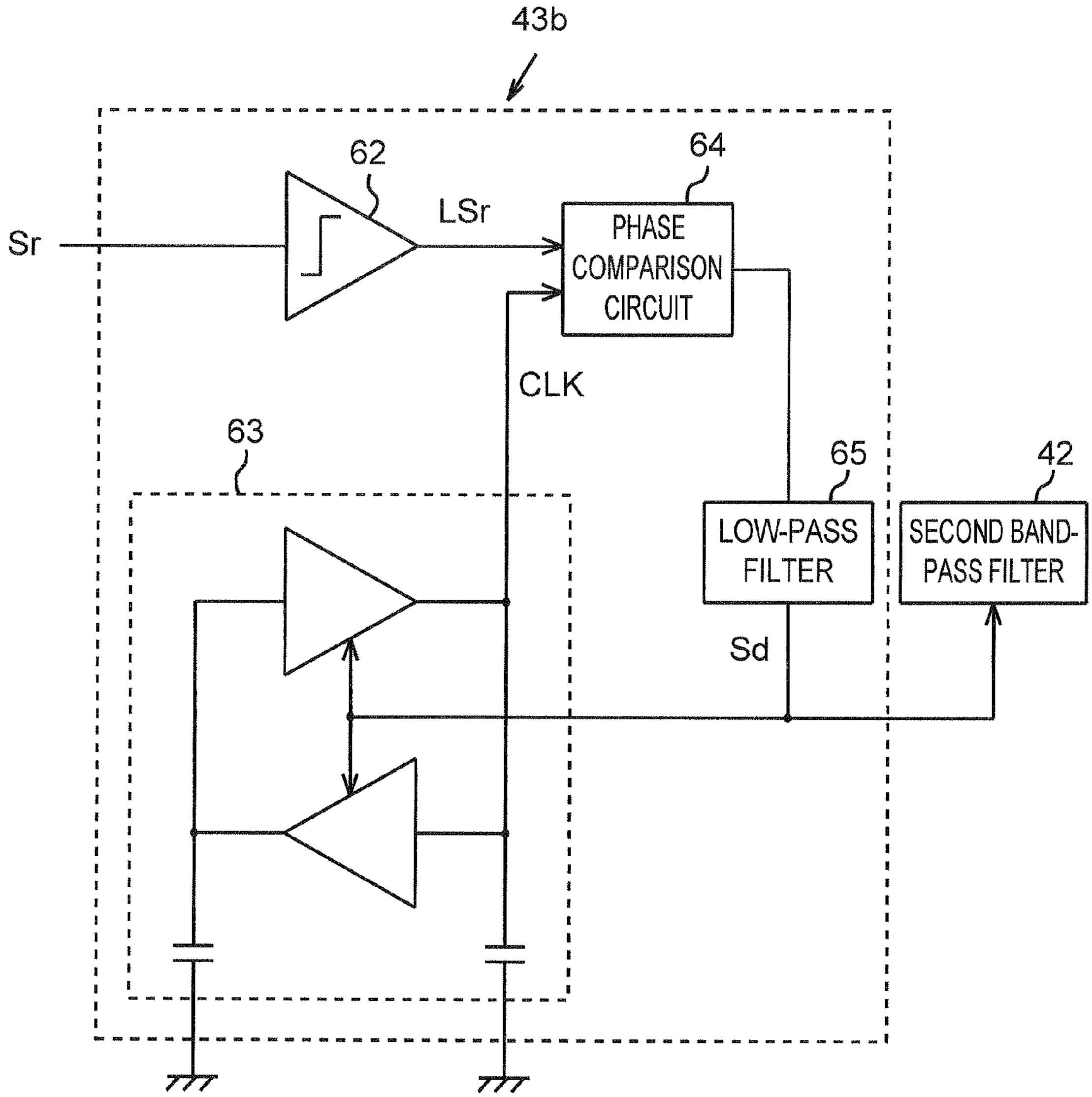
FIG. 15 is an alternative example of a block circuit diagram of an FM demodulation circuit.

For example, as the FM demodulation circuits 43 and 43*a*, a PLL method FM demodulation circuit 43*b* illustrated in FIG. 15 may be used. As illustrated in FIG. 15, the FM demodulation circuit 43*b* includes a limiting amplifier 62, a gm-C oscillator 63, a phase comparison circuit 64, and a low-pass filter 65.

The first band-pass filters 41 and 41*a* input a reception signal Sr to the limiting amplifier 62. The limiting amplifier 62 adjusts amplitudes of the input reception signals Sr to a given amplitude (for example, a full amplitude) and outputs to the phase comparison circuit 64 as a limiting reception signals LSr. The low-pass filter 65 inputs a frequency demodulation signal Sd to the gm-C oscillator 63. The gm-C oscillator 63 changes a frequency of the clock signal CLK according to the input frequency demodulation signal Sd.

The limiting amplifier 62 inputs a limiting reception signal LSr to the phase comparison circuit 64. The gm-C oscillator 63 inputs a clock signal CLK to the phase comparison circuit 64. The phase comparison circuit 64 compares the input limiting reception signal LSr with the input clock signal CLK and outputs the comparison result to the second band-pass filters 42 and 42*a* and the gm-C oscillator 63 through the low-pass filter 65 as a frequency demodulation signal Sd.

With the above described configuration, a control loop that is made up of the gm-C oscillator 63, the phase comparison circuit 64, and the low-pass filter 65 controls so that the frequency of the limiting reception signal LSr matches with the frequency of the clock signal CLK.

In other words, the FM demodulation circuit 43*b* FM-demodulates the reception signal Sr by changing a voltage value of the frequency demodulation signal Sd according to a frequency of the input reception signal Sr.

According to the second implementation, the host device 1*a* and the slave device 2*a* transmit communication signals Sc with different carrier frequencies. However, the carrier frequency may be different; for example, the slave device 2*a* may transmit a communication signal Sc with substantially the same carrier frequency as the carrier frequency of the communication signal Sc received from the host device 1*a*.

With the above described change, in the host device 1*a*, the modulation pattern generator 21 inputs modulation pattern data Dm to the second band-pass filter 42 when the host device 1*a* receives a communication signal Sc from the slave device 2*a*. The second band-pass filter 42 adjusts a pass-band for letting the reception signal Sr pass through to the carrier frequency of the received communication signal Sc according to the input modulation pattern data Dm.

In other words, the host device 1*a* receives the communication signal Sc with substantially the same carrier frequency of the carrier frequency of the communication signal Sc transmitted to the slave device 2*a*. Thus, the second band-pass filter 42 changes the pass-band for letting the reception signal Sr pass through according to the modulation pattern data Dm that is data for generating a carrier frequency of the communication signal Sc to be transmitted to the slave device 2*a*.

On the other hand, in the slave device 2*a*, when a communication signal Sc is transmitted to the host device 1*a*, the setting circuit 71*a* of the communication control circuit 12*a* inputs frequency data Df to the D/A conversion circuit 22*a* of the transmission circuit 13*a*. In other words, the slave device 2*a* transmits a communication signal Sc with substantially the same carrier frequency as the carrier frequency of the communication signal Sc received from the host device is to the host device 1*a*. Thus, the transmission circuit 13*a* generates a carrier wave of a communication signal Sc to be transmitted to the slave device 2*a* according to modulation pattern data Dm for generating a carrier frequency of the communication signal Sc received from the host device 1*a*.

Accordingly, the selection circuit 57 and the setting circuit 71 may be removed from the host device 1*a*. Moreover, the selection circuit 57*a* and the modulation pattern generator 21 may be removed from the slave device 2*a*. Consequently, the circuit sizes of the host device 1*a* and the slave device 2*a* may be reduced for the amount of the removed circuits.

According to the second implementation, the host device 1*a* and the slave device 2*a* transmit transmission data Dt that include modulation pattern data Dm for generating a carrier frequency of a communication signal Sc to be transmitted at that time.

However, data of a carrier frequency of a communication signal Sc to be transmitted is not limited to the above described frequency as long as the frequency is close to the carrier frequency of the communication signal Sc to be transmitted. For example, modulation pattern data Dm may be transmitted that generates a carrier frequency of a communication signal Sc to be transmitted next or a frequency between a carrier frequency of the communication signal Sc to be transmitted at that time and a carrier frequency of the communication signal Sc to be transmitted next.

According to the implementation, as illustrated in FIG. 2, the host devices 1 and 1*a*, and the slave devices 2 and 2*a* increase or decrease a carrier frequency of the communication signal Sc to be transmitted as in a triangular wave. However, a carrier frequency of a communication signal Sc to be transmitted is not limited to the above described frequency as long as it is not a substantially constant frequency. For example, the carrier frequency of the communication signal Sc to be transmitted may be increased or decreased as a saw tooth wave. Moreover, the carrier frequency of the communication signal Sc to be transmitted may be increased or decreased in a step shape.

Therefore, according to the second implementation, the host devices 1 and 1*a* and the slave devices 2 and 2*a* spread a carrier frequency of a communication signal Sc to be transmitted and may reduce noise radiation by reducing a voltage level of a carrier wave of a communication signal Sc as in the first implementation.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although implementations in accordance with aspects of the present inventions have been described in detail, it should be understood that the various changes, substitutions, and alterations could be made hereto without departing from the spirit and scope of the invention.

The invention claimed is:

1. A transmitting and receiving device, comprising:

a transmission circuit that transmits transmission data by FM-modulating a carrier wave of the transmission data, the transmission circuit including:

a modulation pattern generator that generates modulation pattern data, a current-controlled oscillator that changes a cycle of a frequency modulation signal according to the modulation pattern data, and a modulation circuit that generates a communication signal by modifying an amplitude of the frequency modulation signal according to the transmission data;

an FM demodulation circuit that generates a demodulation signal by FM-demodulating a received signal;

a first filter circuit that changes a pass-band for letting the received signal pass through according to the demodulation signal; and a parallel resonance circuit that adjusts a resonance frequency to a first carrier frequency of the communication signal according to the modulation pattern data, and adjusts the resonance frequency to a second carrier frequency of the received signal according to the frequency demodulation data, wherein the transmitting and receiving device performs a power supply line communication through the power supply line in which a signal is transmitted and received among the plurality of transmitting and receiving devices.

2. The transmitting and receiving device according to claim 1, further comprising:

a second filter having a wider frequency pass-band than the first filter circuit;

wherein, the FM demodulation circuit receives the signal through the second filter circuit and to generate the demodulation signal by FM-demodulating the signal received through the second filter circuit.

3. The transmitting and receiving device according to claim 1, wherein, one of transmitting and receiving devices transmits the signal with a carrier wave having a frequency substantially the same as the frequency of the carrier wave of the signal received from the other transmitting and receiving device.

4. The transmitting and receiving device according to claim 3, wherein, the power supply line is branched in a power supply route and a route for transmitting and receiving the signal.

5. The transmitting and receiving device according to claim 4, wherein the first filter circuit changes the pass-band for passing through the signal according to a given frequency for starting transmission of the signal, and the resonance circuit changes the resonant frequency according to the given frequency for starting transmission of the signal.

6. The transmitting and receiving device according to claim 5, wherein the transmission circuit includes a third filter circuit changes a cut off frequency according to a frequency of a carrier wave.

7. A method for power supply line communication, the method comprising:

transmitting a signal by FM-demodulating a carrier wave;

generating modulation pattern data;

changing a cycle of a frequency modulation signal according to the modulation pattern data;

generating a communication signal by modifying an amplitude of the frequency modulation signal according to the transmission data;

generating a demodulation signal by FM-demodulating a received signal;

changing a pass-band for letting the received signal pass through according to the demodulation signal;

adjusting a resonance frequency to a first carrier frequency of the communication signal according to the modulation pattern data; and adjusting the resonance frequency to a second carrier frequency of the received signal according to the frequency demodulation data; and transmitting and receiving a signal among a plurality of transmitting and receiving devices via a power supply line.

* * * * *